(12) United States Patent
Yu et al.

(10) Patent No.: US 8,848,631 B2
(45) Date of Patent: Sep. 30, 2014

(54) WIRELESS COMMUNICATION APPARATUS, WIRELESS COMMUNICATION SYSTEM, AND WIRELESS COMMUNICATION METHOD

(75) Inventors: Qian Yu, Singapore (SG); Masayuki Hoshino, Kanagawa (JP); Daichi Imamura, Kanagawa (JP); Kenichi Miyoshi, Kanagawa (JP); Megumi Ichikawa, legal representative, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 745 days.

(21) Appl. No.: 13/119,796

(22) PCT Filed: Aug. 31, 2009

(86) PCT No.: PCT/JP2009/004273
§ 371 (c)(1),
(2), (4) Date: May 13, 2011

(87) PCT Pub. No.: WO2010/032385
PCT Pub. Date: Mar. 25, 2010

(65) Prior Publication Data
US 2012/0120884 A1  May 17, 2012

(30) Foreign Application Priority Data

Sep. 22, 2008  (JP) ................................. 2008-242703

(51) Int. Cl.
*H04B 7/204* (2006.01)
*H04B 7/04* (2006.01)
*H04B 7/06* (2006.01)

(52) U.S. Cl.
CPC ............ *H04B 7/0426* (2013.01); *H04B 7/0452* (2013.01); *H04B 7/0663* (2013.01)
USPC .......................................... 370/329; 370/319

(58) Field of Classification Search
USPC ........ 370/328, 329, 330, 335, 336, 337, 342, 370/343, 344, 345, 347
See application file for complete search history.

(56) References Cited

U.S. PATENT DOCUMENTS

2008/0037681 A1  2/2008  Walton et al.
2009/0067382 A1*  3/2009  Li et al. ........................ 370/330

(Continued)

FOREIGN PATENT DOCUMENTS

JP  2007-214995 A  8/2007
JP  2008-193648 A  8/2008

(Continued)

OTHER PUBLICATIONS

International Search Report for PCT/JP2009/004273 dated Oct. 6, 2009.
Masayuki Kimata, et al.; "Uplink Multiuser MIMO ni Okeru Throughput Tokusei no Kento", Proceedings of the Society Conference of IEICE, Aug. 29, 2007, p. 365.

*Primary Examiner* — Michael Thier
*Assistant Examiner* — Feben M Haile
(74) *Attorney, Agent, or Firm* — Pearne & Gordon LLP

(57) ABSTRACT

Interference between users in an MU-MIMO system is minimized by effective precoding, without increasing an overhead of control data. In a wireless communication system in which multiplex communication is possible between multiple UE1, UE2, and BS, a channel estimation and precoding selection unit 539 in BS estimates channels from the respective UE1, UE2 to the BS, determines a precoding matrix P from a projection matrix to make the two channel response matrices orthogonal or nearly orthogonal, and feeds back the precoding matrix P to UE2, and executes precoding on only UE2 of the two. A precoding unit 524 in the UE2 employs the precoding matrix P that has been notified to perform precoding of a data stream, and sends the precoded data stream to the BS.

12 Claims, 12 Drawing Sheets

(56) References Cited

U.S. PATENT DOCUMENTS

| | | |
|---|---|---|
| 2009/0129259 A1* | 5/2009 | Malladi et al. .............. 370/210 |
| 2009/0323773 A1* | 12/2009 | Bala et al. .................. 375/141 |
| 2010/0054113 A1 | 3/2010 | Haardt et al. |
| 2010/0103901 A1 | 4/2010 | Miki et al. |

FOREIGN PATENT DOCUMENTS

| | | |
|---|---|---|
| WO | 2006-048037 A1 | 5/2006 |
| WO | 2007-033997 A1 | 3/2007 |

* cited by examiner

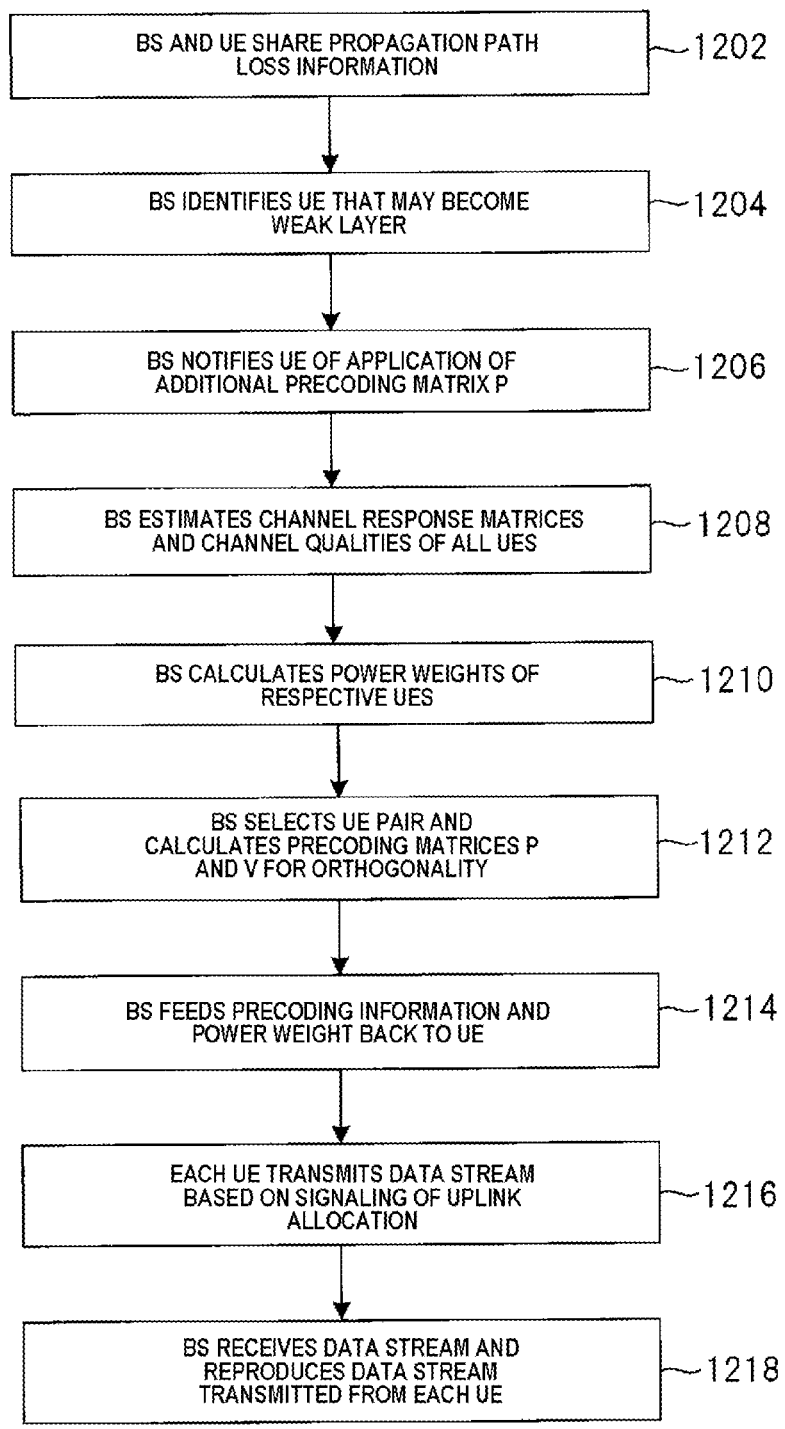

WIRELESS COMMUNICATION APPARATUS, WIRELESS COMMUNICATION SYSTEM, AND WIRELESS COMMUNICATION METHOD

TECHNICAL FIELD

The present invention relates to a wireless communication apparatus, a wireless communication system, and a wireless communication method, which are used in a MIMO (Multiple Input Multiple Output) system that performs communication using a plurality of antennas.

BACKGROUND ART

The MIMO system is a communication system that uses multiple transmission antennas and multiple reception antennas for data communication. In a multiple-access MIMO system in which a plurality of wireless communication apparatuses are simultaneously accessible, an access point to which a user equipment is connected may communicate with one or more user equipments at a certain time point. In the case where the access point communicates with a single user equipment, a plurality of transmission antennas are related to one transmission substance (any one of an access point and a user equipment), and a plurality of reception antennas are related to one reception substance (any one of the user equipment and the access point).

This access point can also communicate with a plurality of user equipments through communication of SDMA (Space Division Multiple Access). Hereinafter, the multiple-access MIMO system using the SDMA is called a MU-MIMO (Multi User MIMO) system. In an MU-MIMO system in the related art, an access point uses a plurality of antennas for data transmission and reception, and each user equipment typically uses one antenna for data transmission and a plurality of antennas for data reception. In a downlink and an uplink, the access point can communicate with one or more user equipments at a certain time point. The downlink (that is, forward link) is a communication link from the access point to the user equipment, and the uplink (that is, backward link) is a communication link from the user equipment to the access point.

The access point is a wireless communication apparatus achieved by a fixed base station that typically communicates with a user equipment, and may be called a base station or another technical term. The user equipment is a fixed or movable wireless communication apparatus, and may be called a base station, a wireless device, a mobile station, a user device, or another technical term. Hereinafter, it is assumed that a BS (Base Station) is used for an access point and a UE (User Equipment) is used for a user equipment.

Several important subjects in an MU-MIMO system for an uplink are (1) selection of a UE group that is appropriate for simultaneous communication and (2) respective UEs selected by a method for achieving good system performance through the reduction of interference and/or data transmission between the respective UEs. Precoding that uses a limited feedback signal of channel information for each UE has been proposed to improve the performance of the system that uses the SDMA (for example, see Patent Literature 1 below). In the MIMO system, precoding is a technique for performing transmission by forming beams that are appropriate to the situation of a propagation path through transmission of weighted data from a plurality of antennas when the transmission is performed from the plurality of antennas. In this case, in order to reflect the observed situation (propagation path situation) of a received signal in a reception point, a feedback signal that includes beam information is transmitted from a receiver to a transmitter, and the transmitter controls the beams using the feedback signal.

CITATION LIST

Patent Literature

Patent Literature 1: US 2008/0037681 A1

SUMMARY OF INVENTION

Technical Problem

However, for efficient precoding taking into consideration interference between users in cases where such precoding is used, feedback of channel information having high granularity and a complicated scheduling procedure are required. Because of this, the method that uses the precoding results in an overhead of a large quantity of control information and a complexity of packaging with respect to the system. Accordingly, there is need for a technique that can provide the SDMA for MU-MIMO more efficiently in respect of transmission performance and signaling in the corresponding field.

As described above, in the case of performing the SDMA communication in the MU-MIMO system, a complicated scheduling process may be required to select a proper UE group, or the overhead of control information may be increased in order to perform effective precoding that reduces interference between users.

The present invention is made in view of the above circumstances, and an object of the invention is to provide a wireless communication apparatus, a wireless communication system, and a wireless communication method, which can minimize the interference between users through effective precoding without increasing the overhead of control information in an MU-MIMO system.

Solution to Problem

The present invention provides, as a first aspect, a wireless communication apparatus of a base station used in a wireless communication system that can perform multiplex communication between a plurality of user equipments and the base station, the wireless communication apparatus including: a channel estimation unit which is adapted to perform channel estimation of a propagation path from the user equipment to the wireless communication apparatus; a scheduling unit which is adapted to select a pair of user equipments that perform the multiplex communication based on a result of the channel estimation; a precoding selection unit which is adapted to determine a precoding matrix of a projection matrix that is applied to a channel response matrix of one user equipment in order to make channel response matrices of the respective user equipments orthogonal or almost orthogonal to each other in the selected pair of user equipments; a control information notification unit which is adapted to feed back control information that includes precoding information that indicates the determined precoding matrix to the corresponding user equipments; a reception unit which is adapted to receive data transmitted from the respective user equipments of the selected pair of user equipments through a plurality of reception antennas; a signal separation unit which is adapted to separate the received data to detect a plurality of streams; and a decoding unit which is adapted to decode reception data from the plurality of detected streams.

The present invention includes, as a second aspect, the wireless communication apparatus, wherein the reception unit receives data from the user equipments that transmit a plurality of space-multiplexed streams through a plurality of transmission antennas, and the precoding selection unit determines the precoding matrix of the projection matrix in order to make the channel response matrices of the respective user equipments that transmit the plurality of streams orthogonal or almost orthogonal to each other.

The present invention includes, as a third aspect, the wireless communication apparatus, wherein the precoding selection unit determines the precoding matrix by calculating a unitary matrix which makes a trace of an inner product of the precoding matrix that is applied to the respective user equipments in the pair of user equipments equal to or smaller than a predetermined value based on the channel response matrices of the user equipments or selecting the unitary matrix from a code book having a preset matrix group.

The present invention includes, as a fourth aspect, the wireless communication apparatus, wherein the scheduling unit selects a first user equipment that is a strong layer having a strong received signal intensity and a second user equipment that is a weak layer having a weak received signal intensity as the pair of user equipments, the precoding selection unit determines the preocoding matrix of the projection matrix that is applied to the first user equipment, and the control information notification unit notifies only the first user equipment of the precoding information that indicates the precoding matrix of the projection matrix.

The present invention includes, as a fifth aspect, the wireless communication apparatus, wherein the control information notification unit notifies only the one user equipment that applies the precoding matrix of the precoding information that indicates the precoding matrix of the projection matrix.

The present invention includes, as a sixth aspect, the wireless communication apparatus, wherein the precoding selection unit determines a first precoding matrix of the projection matrix that is applied only to the one user equipment and a second precoding matrix for forming transmission beams that is applied to the respective user equipments, and the control information notification unit notifies only the one user equipment of the precoding information that indicates the first precoding matrix and notifies the respective user equipments of the precoding information that indicates the second precoding matrix.

The present invention includes, as a seventh aspect, the wireless communication apparatus further including a power weight determination unit which is adapted to perform transmission power distribution to the selected pair of user equipments and to determine power weights allocated to the respective user equipments, wherein the precoding selection unit determines the precoding matrix of the projection matrix that is applied to the one user equipment having the different power weight, and the control information notification unit notifies the one user equipment of the precoding information that indicates the precoding matrix of the projection matrix.

The present invention provides, as an eighth aspect, a wireless communication apparatus of a user equipment used in a wireless communication system that can perform multiplex communication between a plurality of user equipments and a base station, the wireless communication apparatus including: a space multiplexing unit which is adapted to generate a plurality of streams for performing space multiplexing among a plurality of transmission antennas as data that is to be transmitted to the base station; a precoding unit which is, in a case where precoding information is notified, which indicates a precoding matrix of a projection matrix that is applied to a channel response matrix of one user equipment in order to make channel response matrices of the respective user equipments orthogonal or almost orthogonal to each other in a pair of user equipments that perform the multiplex communication based on control information that is fed back from the base station, adapted to perform precoding by applying the precoding matrix with respect to the plurality of streams; and a transmission unit which is adapted to transmit the plurality of streams to which the precoding process has been subjected through the plurality of transmission antennas.

The present invention includes, as a ninth aspect, the wireless communication apparatus, wherein the precoding unit performs first precoding to which a first precoding matrix of the projection matrix is applied and second precoding to which a second precoding matrix for forming transmission beams is applied.

The present invention includes, as a tenth aspect, the wireless communication apparatus, further including a power allocation unit which is adapted to perform allocation of transmission power to the plurality of streams using power weights notified from the base station.

The present invention provides, as an eleventh aspect, a wireless communication system that can perform multiplex communication between a plurality of user equipments and the base station, wherein a wireless communication apparatus of the base station includes: a channel estimation unit which is adapted to perform channel estimation of a propagation path from the user equipment to the wireless communication apparatus; a scheduling unit which is adapted to select a pair of user equipments that perform the multiplex communication based on a result of the channel estimation; a precoding selection unit which is adapted to determine a precoding matrix of a projection matrix that is applied to a channel response matrix of one user equipment in order to make channel response matrices of the respective user equipments orthogonal or almost orthogonal to each other in the selected pair of user equipments; a control information notification unit which is adapted to feed back control information that includes precoding information that indicates the determined precoding matrix to the corresponding user equipments; a reception unit which is adapted to receive data transmitted from the respective user equipments of the selected pair of user equipments through a plurality of reception antennas; a signal separation unit which is adapted to separate the received data to detect a plurality of streams; and a decoding unit which is adapted to decode the received data from the plurality of detected streams, wherein each wireless communication apparatus of the plurality of user equipments includes: a space multiplexing unit which is adapted to generate a plurality of streams for performing space multiplexing among a plurality of transmission antennas as data that is transmitted to the base station; and a transmission unit which is adapted to transmit the plurality of streams through the plurality of transmission antennas, and wherein one wireless communication apparatus of the plurality of user equipments comprises a precoding unit which is adapted to perform precoding by applying the precoding matrix with respect to the plurality of streams in a case where precoding information which indicates the precoding matrix of the projection matrix is notified based on the control information that is fed back from the base station.

The present invention provides, as a twelfth aspect, a wireless communication system that can perform multiplex communication between wireless communication apparatuses of a plurality of transmission stations and one or a plurality of wireless communication apparatuses of reception stations, wherein each of the plurality of transmission stations selected as a pair of transmission stations that perform the multiplex communication includes a transmission unit which is adapted to transmit a plurality of space-multiplexed streams, the reception station includes a signal separation unit which is adapted to separate and detect the plurality of streams respectively transmitted from the plurality of transmission stations, and the wireless communication system further includes: a precoding selection unit which is adapted to determine a precoding matrix of a projection matrix that is applied to a channel response matrix of one transmission station in order to make channel response matrices from the respective transmission stations to the reception stations orthogonal or almost orthogonal to each other; and a precoding unit which is adapted to perform precoding by applying the precoding matrix of the projection matrix in the one transmission station.

The present invention provides, as a thirteenth aspect, a wireless communication method in a wireless communication system that can perform multiplex communication between a plurality of user equipments and the base station, the wireless communication method including the steps of performing channel estimation of a propagation path from the user equipment to the own apparatus; selecting a pair of user equipments that perform the multiplex communication based on a result of the channel estimation; determining a precoding matrix of a projection matrix that is applied to a channel response matrix of one user equipment in order to make channel response matrices of the respective user equipments orthogonal or almost orthogonal to each other in the selected pair of user equipments; feeding control information that includes precoding information that indicates the determined precoding matrix back to the corresponding user equipments; receiving data transmitted from the respective user equipments of the selected pair of user equipments through a plurality of reception antennas; separating the received data to detect a plurality of streams; and decoding reception data from the plurality of detected streams.

The present invention provides, as a fourteenth aspect, a wireless communication method in a wireless communication system that can perform multiplex communication between a plurality of user equipments and a base station, the wireless communication method including the steps of generating a plurality of streams for performing space multiplexing among a plurality of transmission antennas as data that is to be transmitted to the base station; performing precoding, in a case where precoding information is notified, which indicates a precoding matrix of a projection matrix that is applied to a channel response matrix of one user equipment in order to make channel response matrices of the respective user equipments orthogonal or almost orthogonal to each other in a pair of user equipments that perform the multiplex communication based on control information that is fed back from the base station, by applying the precoding matrix to the plurality of streams; and transmitting the plurality of streams to which the precoding process has been subjected through the plurality of transmission antennas.

According to the above-described configuration, by applying a precoding matrix of a projection matrix based on a channel response matrix to one of user equipments, it is possible to perform effective precoding for maintaining the orthogonality of a plurality of user equipments and to minimize the interference between users without increasing the overhead of control information.

Advantageous Effects of Invention

According to the aspects of the invention, in an MU-MIMO system, a wireless communication apparatus, a wireless communication system, and a wireless communication method can be provided, which can minimize the interference between users by the effective precoding without increasing the overhead of control information.

BRIEF DESCRIPTION OF DRAWINGS

FIG. 12 is a flowchart illustrating an operational procedure in the third exemplary embodiment of the invention.

DESCRIPTION OF EMBODIMENTS

Figure 1:
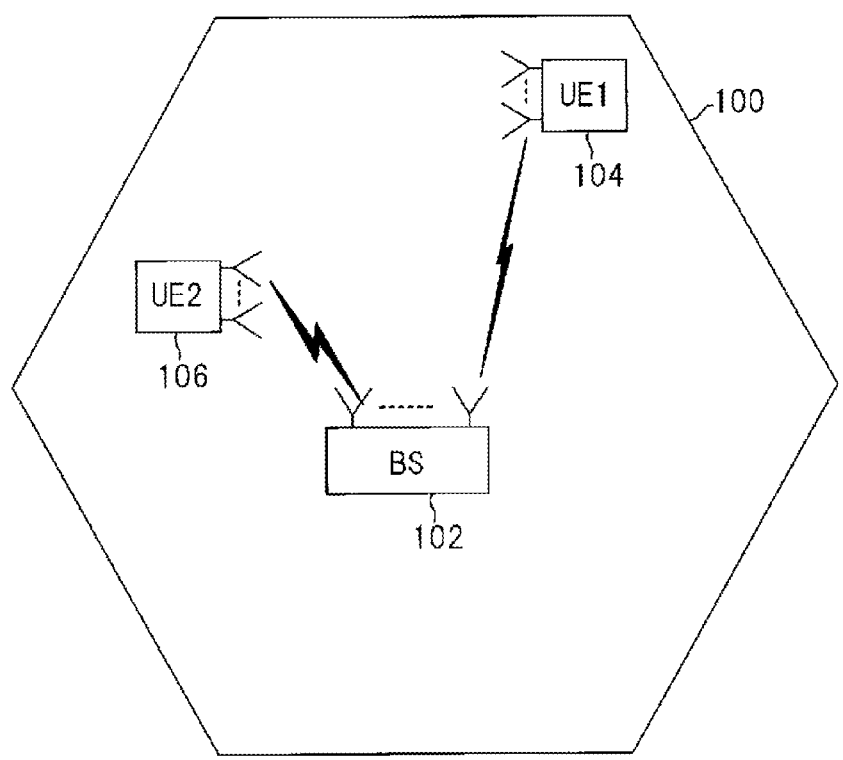
FIG. 1 is a diagram illustrating the configuration of an MU-MIMO system having a BS and UEs.

Exemplary embodiments of the invention indicates a configuration example of a wireless communication system which adopts an MU-MIMO in an uplink of a cellular wireless communication network and performs simultaneous communication by SDMA between a plurality of UEs and a BS as an example of a wireless communication apparatus, a wireless communication system, and a wireless communication method.

Exemplary embodiments of the invention relate generally to remote communication, and more particularly to a method and apparatus for transmission by a plurality of antennas for SDMA and a product in a MIMO system.

First, a technique of performing transmission by a plurality of antennas for SDMA in a MIMO system will be described. This technique may be used in combination with various kinds of wireless techniques, such as CDMA (Code Division Multiple Access), OFDM (Orthogonal Frequency Division Multiplexing), TDMA (Time Division Multiple Access), and the like. In uplink transmission by a plurality of user equipments (UEs) with respect to a single base station (BS), an uplink channel response matrix is obtained for each operating UE. In each scheduling period, the BS selects a UE pair that performs simultaneous transmission by following a scheduling policy, and calculates a corresponding precoding matrix based on a loss parameter of a propagation path and a channel response matrix of the UE. The BS feeds back a precoding matrix to one of the UE pair and applies a data stream that is obtained by multiplying the same by the precoding matrix to the one of the UE pair.

In an uplink transmission process, each selected UE obtains a data symbol stream by processing the data stream in accordance with a base wireless technique (for example, CDMA, OFDM, or TDMA). Each UE further executes a spatial process with respect to the data symbol stream, and if the precoding matrix is allocated from the BS to the UE, the UE generates a set of transmitted symbol streams so that each antenna of the UE outputs one transmitted symbol stream by applying the precoding using the precoding matrix. Each UE of the selected UE pair simultaneously transmits the generated data symbol streams from the plurality of antennas to the BS through their individual MIMO channels. The BS receives the plurality of received symbol streams from the plurality of antennas. The BS reproduces the data symbol streams transmitted from the selected UE pair by performing a reception spatial process of the received symbol streams in accordance with a linear or non-linear spatial processing technique.

The system and the method according to exemplary embodiments of the invention as described herein cope with the necessity as described above, by providing a method of transmitting data from a plurality of UEs to the BS in a cellular wireless communication system. According to exemplary embodiments of the invention, by applying the precoding to one of the UE pair that forms the SDMA in an MU-MIMO system, interference between data streams transmitted from different UEs is minimized, and/or the possibility of scheduling using the SDMA is increased to improve the multiplexing gain. By applying a simple precoding only to one of the UE pair and notifying only the one of the UE pair of detailed precoding information, the influence on the overhead of signaling when the control information is fed back from the BS to the UE is minimized. Accordingly, it becomes possible to reduce the interference as maintaining the entire channel capacity without greatly increasing the amount of control information, the degree of freedom of selecting the UE pairing is increased, and a sufficient communication quality is secured in the selected UE pair.

Exemplary embodiments of the invention include the following processing procedure.
(1) A step in which the BS shares a loss parameter of a propagation path on the corresponding channel with the UE,
(2) A step in which the BS identifies which UE seems to be weaker based on the propagation path loss,
(3) A step in which the BS instructs whether to use a precoding matrix to further reduce the interference between users for the respective UEs,
(4) A step in which the BS estimates a channel response matrix using a reference signal for all operating UEs,
(5) A step in which the BS selects a UE pair according to a scheduling policy, calculates the corresponding precoding matrix, and makes the precoded channel response matrices orthogonal to each other,
(6) A step in which the BS feeds the precoding matrix selected in step (3) back to one of the UEs, and feeds other transmission parameters back to all paired UEs,
(7) A step in which each UE transmits a data stream based on the signaling allocation of the corresponding uplink, and
(8) A step in which the BS receives the data streams from the respective UEs and obtains reproduced data-streams for the respective UEs of the selected UE pair by executing a MU-MIMO detection process.

According to one exemplary embodiment of the invention, a cellular wireless communication system includes a plurality of UEs having a plurality of transmission antennas, and one BS having a plurality of reception antennas. The BS has means for configuring the SDMA for processing a plurality of spatial data streams by applying UE pairing, and by scheduling and precoding to the plurality of UEs. This means includes functions of performing selection of a UE pair and the corresponding precoding matrix to be used on one of the paired UEs based on the propagation path loss and the channel response matrix of the respective channels, and a function of feeding the precoding instruction and other transmission parameters back to the respective corresponding UEs.

These and other features and advantages of the present invention will be more apparent from the following detailed description of the exemplary embodiments of the invention taken in conjunction with the accompanying drawings and appended claims.

Preferred exemplary embodiments of the present invention will be described in detail with reference to the accompanying drawings. In the following description of the present invention, a detailed description of known functions and configurations incorporated herein will be omitted in consideration of clarity and simplicity.

FIG. 1 is a diagram illustrating the configuration of an MU-MIMO system having a BS and UEs. In FIG. 1, one BS and two UEs are illustrated for simplicity. The MU-MIMO system 100 has a BS 102 and UEs 104 and 106, and in a downlink and an uplink, uses a plurality of transmission antennas and a plurality of reception antennas for data transmission. A selected pair of UEs (UE pair) collectively represents a plurality of outputs for downlink transmission and a plurality of inputs for uplink transmission. The selected UEs transmit respective user-dedicated data, and/or receive the respective user-dedicated data from the BS. Hereinafter, data transmission on the uplink will be described in detail.

Figure 2:
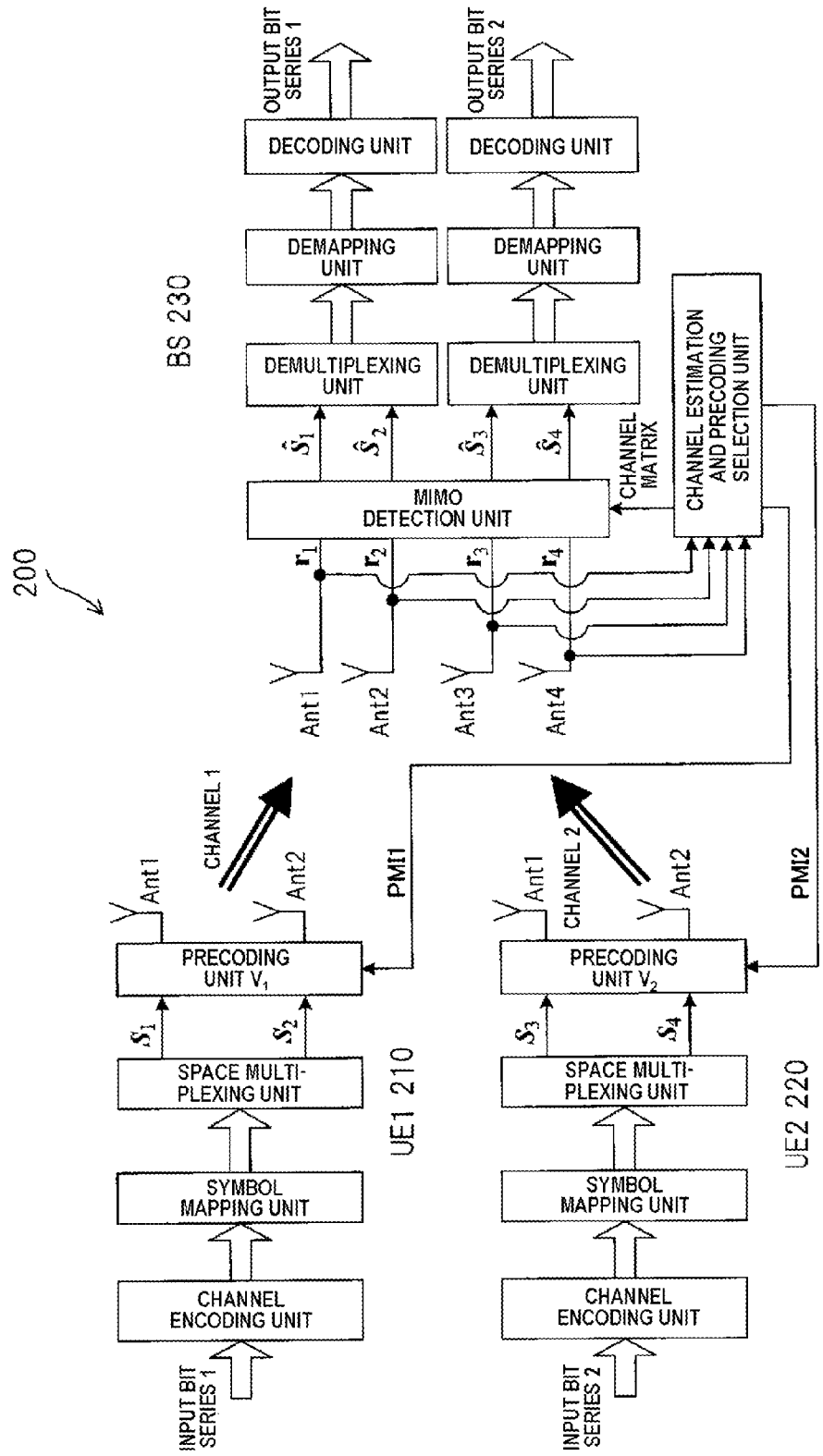
FIG. 2 is a block diagram illustrating a configuration example of the MU-MIMO system.

FIG. 2 is a block diagram illustrating a configuration example of an MU-MIMO system. In the configuration example of FIG. 2, the MU-MIMO system 200, like the above-described Patent Literature 1, is an example in which the precoding is applied to each UE. Here, a case where two UEs (UE1_210 and UE2_220) communicate with a BS 230 is illustrated. Each UE is provided with a plurality of antennas, for example, two antennas, for performing wireless transmission in the respective uplinks, which are toward the BS having a plurality of reception antennas, for example, four reception antennas. Uplink MIMO channels that are formed by the reception antennas of the BS and the transmission antennas of the given UEs are characterized by a channel response matrix with N rows and M columns. Here, i represents an index of the selected UE in each UE pair. Generally, each UE relates to a different uplink channel response matrix having dimensions that are determined by the number M of antennas of the UE and the number N of antennas of the BS. This uplink channel response matrix will be described.

By decomposing an uplink channel response matrix $H_i$ related to the $UE_i$ using singular value decomposition, a corresponding projection matrix, that is, a right singular matrix, is obtained. The singular value decomposition of the uplink channel response matrix $H_i$ is represented by Equation (1) below.

(Equation 1)

$$H_i = U_i \Lambda_i V_i^H \quad (1)$$

Here, $U_i$ represents a unitary matrix with N rows and N columns (N×N) composed of left inherent vectors of $H_i$, $\Lambda_i$ represents a diagonal matrix with N rows and M columns (N×M) composed of singular values of $H_i$, $V_i$ represent a unitary matrix with M rows and M columns (M×M) composed of left inherent vectors of $H_i$, and a superscript "H" represents a codomain transposed matrix. The unitary matrix X is characterized by a characteristic equation $X^H X = I$, and here, I represents a unit matrix. The columns of the unitary matrix are orthogonal to each other.

Using the SDMA (MU-MIMO), the UE may simultaneously transmit in parallel data existing on the uplink to the BS. In an example of FIG. 2, each UE performs a spatial process of communication data using the right inherent value vector $V_i$ of the uplink channel response matrix $H_i$ as the precoding matrix. It is only possible for the BS to estimate the actual uplink channel response matrix $\hat{H}_i$, based on a sounding reference signal (SRS) that is transmitted by the UE. Because of this, the precoding matrix $\hat{V}_i$ may be derived and quantified based on Equation (1). Here, a matrix, such as Hi, Vi, to which "^" is not attached, indicates theoretical values, and a matrix, such as $\hat{H}_i$, $\hat{V}_i$ (to be accurate, "^" should be affixed over the letter such as H as shown by following equations), to which "^" is attached, indicates an actually applied matrix that is determined using a code book or the like. The same shall apply hereinafter. It is necessary for the BS to feed the selected precoding matrix $\hat{V}_i$ back to the respective paired UEs and to notify the UEs of the precoding matrix to be used in the uplink transmission. As a result, the respective UEs of the UE pair may transmit the data in a main inherent mode of the uplink MIMO channel. That is, the respective $UE_i$ may obtain M transmission symbols indicated by Equation (2) below by performing a spatial process of data symbols $S_i = [S_{i,1}, \ldots S_{i,M}]^T$ using the notified precoding matrix.

(Equation 2)

$$x_i = \hat{V}_i s_i \quad (2)$$

Accordingly, the received signal in the BS is represented by Equation (3) below.

(Equation 3)

$$\begin{aligned} Y &= H_1 \hat{V}_1 s_1 + H_2 \hat{V}_2 s_2 + W \\ &= [H_1 \ H_2] VS + W \\ &= \overline{HS} + W \end{aligned} \quad (3)$$

Here, matrices V and S are represented by Equation (4) below.

(Equation 4)

$$V = \begin{bmatrix} \hat{V}_1 & 0 \\ 0 & \hat{V}_2 \end{bmatrix}, \quad S = \begin{bmatrix} s_1 \\ s_2 \end{bmatrix} \quad (4)$$

Also, a* matrix $H^-$ (to be accurate, as represented in the following equation, "-" should be affixed over the letter "H") is an effective SDMA channel represented by Equation (5) below.

(Equation 5)

$$\overline{H} = [H_1 \hat{V}_1 H_2 \hat{V}_2] \quad (5)$$

However, the interface between users is not processed using the above-described uplink SDMA precoding. This is because the orthogonality between UEs is not maintained in the precoding in the above-described example. The interference between users of the paired UEs is very important problem that causes the performance deterioration of the SMDA, and particularly, the interference between users seriously deteriorates the system performance in the paring of a strong layer (terminal having a strong received signal intensity) and a weak layer (terminal having a weak received signal intensity). The strong layer indicates a UE in which the data stream, which is transmitted from the UE or the like that is in the center of a cell, is received with a much higher SINR (Signal-to-Interference plus Noise power Ratio), and the weak layer indicates a UE in which the data stream, which is transmitted from the UE or the like that is in the edge portion of the cell, is received with much lower SINR. In the case of using the related art for SDMA, the orthogonality between the UEs depends on the scheduler only. That is, an orthogonal or nearly orthogonal UE group is paired by the scheduler for each transmission of MU-MIMO. In this case, however, since the scheduling possibility is reduced by selecting the orthogonal UE pair, the low scheduling possibility may cause the reduction of the multiplexing gain. On the other hand, if the scheduling possibility is increased, the system performance deteriorates greatly.

Figure 3:
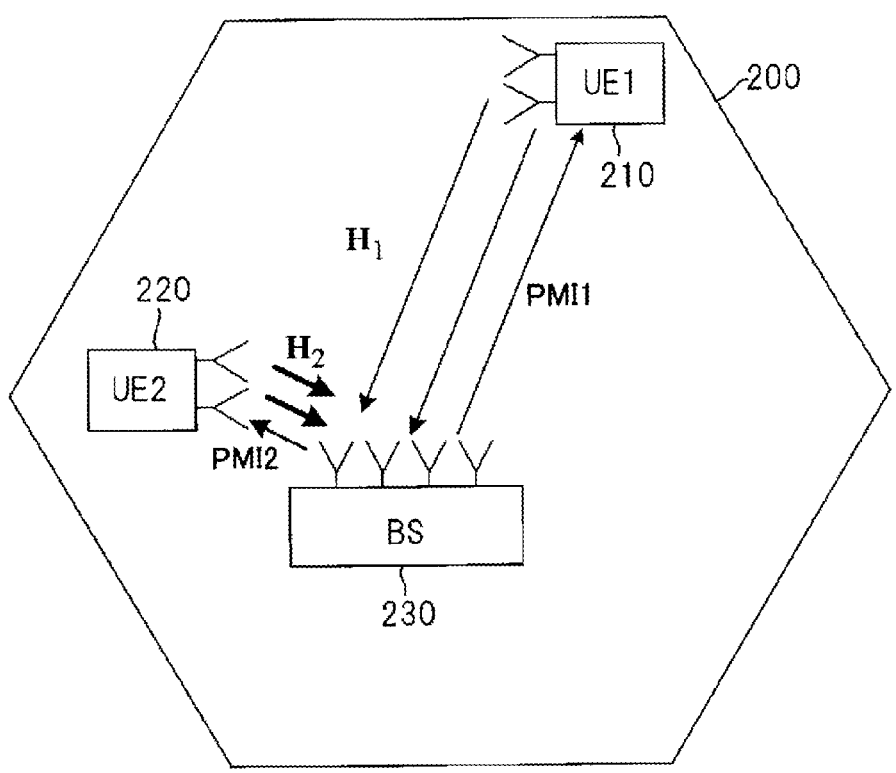
FIG. 3 is a diagram illustrating the brief configuration of the MU-MIMO system that corresponds to the configuration example of FIG. 2.

Here, the interface between users will be described. FIG. 3 is a diagram illustrating the brief configuration of the MU-MIMO system that corresponds to the configuration example of FIG. 2. Here, in the MU-MIMO system 200, a case where UE1_210 that is a weak layer and UE2_220 that is a strong layer perform MU-MIMO transmission of a 2×4 uplink with respect to the BS 230 is illustrated.

In this case, an uplink channel response matrix between UE1_210 and BS 230 is H1, an uplink channel response matrix between UE2_220 and BS 230 is H2, and the BS feeds precoding information PMI1 and PMI2 that instruct precoding matrices $V_1$ and $V_2$, respectively, back to the respective UEs. In order to reduce the interference between users and to maintain the orthogonality between the UEs, it is necessary to feed back the precoding information having high granularity. Thus, the load of the scheduler is increased due to the complicated scheduling, and the number of bits of the precoding information PMI1 and PMI2 is increased to cause the overhead of the signaling to be increased.

Figure 4:
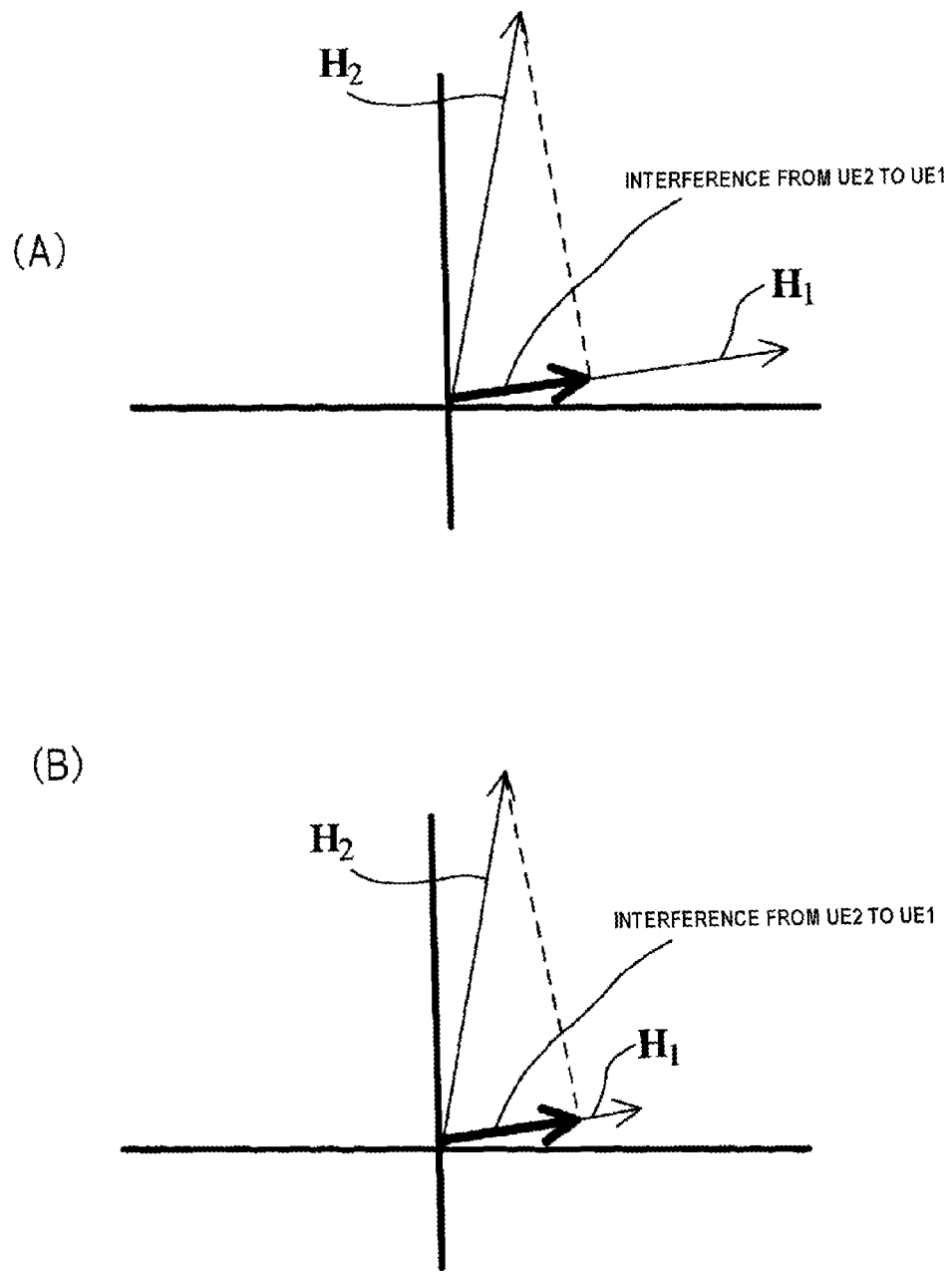
FIG. 4 is a schematic diagram two-dimensionally illustrating the uplink channel response matrices between respective UEs and a BS in the configuration example of FIG. 2, where (A) is a diagram illustrating a case where a power balance between the uplink channel response matrices of a UE pair is found; and (B) is a diagram illustrating a case where there is a power difference between the uplink channel response matrices of the UE pair.

FIG. 4 is a schematic diagram two-dimensionally illustrating the uplink channel response matrices between the respective UEs and the BS in the configuration example of FIG. 2. In this example, the channel matrix, which is actually a four-dimensional space, is schematically illustrated in two dimensions for simplicity. The actual four-dimensional space is not accurately indicated. In FIG. 4, the respective channel matrices are indicated by vectors, and the length of the vector indicates power (that is, SINR). The projection vectors from the uplink channel response matrix of one of the UEs to the uplink channel response matrix of the other of the UEs indicate the interference between the UEs. As illustrated in (A) of FIG. 4, in the case where the power balance between the uplink channel response matrices $H_1$ and $H_2$ of the UE pair is found, the interference from UE2 to UE1 is small with respect to a desired signal. However, as illustrated in (B) of FIG. 4, if there is a difference in power between the uplink channel response matrices $H_1$ and $H_2$ of the UE pair, that is, in the case of a combination of UE1_210 that is a weak layer and UE2_220 that is a strong layer as illustrated in FIG. 3, the interference from UE2 to UE1 is large with respect to the desired signal, and thus the communication quality of the system deteriorates greatly.

In exemplary embodiments of the invention, in order to reduce the interference between users much more in the MU-MIMO system, it is proposed to orthogonalize the effective channels between the paired UEs as much as possible by further applying the precoding. In these exemplary embodiments of the invention, a system and a method for improving the performance of the communication channels in the communication system are provided, and thus, for example, the performance of the communication channels in the uplink SDMA communication system is improved. By applying the precoding according to these exemplary embodiments of the invention, it becomes possible to reduce the interference between the users in the MU-MIMO system and to suppress the complexity of the scheduling process and the increase of the signaling overhead of the feedback information for precoding.

First Embodiment

Figure 5:
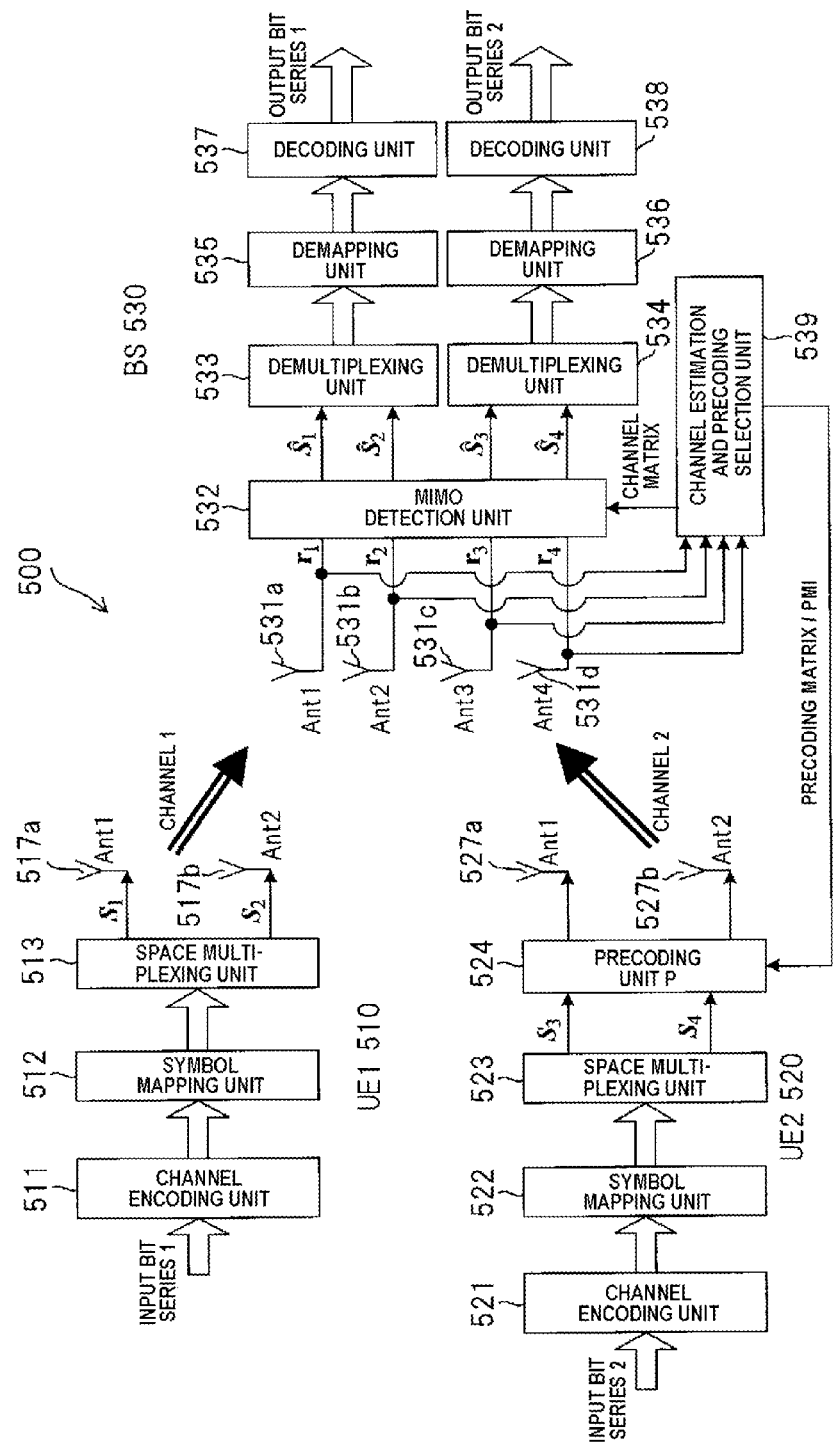
FIG. 5 is a block diagram illustrating a first example of the configuration of a wireless communication system that uses a cellular wireless communication network as a first exemplary embodiment of the invention.

FIG. 5 is a block diagram illustrating a first example of the configuration of a wireless communication system that uses a cellular wireless communication network as a first embodiment of the invention. The first embodiment corresponds to a configuration example in the case where each UE has two transmission antennas and a BS has four reception antennas, and indicates a wireless communication system that performs communication of an uplink by MU-MIMO between a UE pair of two selected UEs and one BS. In this case, the number of antennas is not limited to 2 or 4, and a plurality of antennas may be appropriately determined.

The MU-MIMO system 500 according to the first embodiment includes UE1_510 that is a first user equipment, UE2_520 that is a second user equipment, and BS 530 that is a base station. UE1_510 and UE2_520 simultaneously transmit space-multiplexed data streams to the BS 530 through two transmission antennas, respectively, by a MU-MIMO communication using SDMA. UE1_510 has transmission antennas 517a(Ant1) and 517b(Ant2), and UE2_520 has transmission antennas 527a(Ant1) and 527b(Ant2). The BS 530 has reception antennas 531a(Ant1), 531b(Ant2), 531c(Ant3), and 531d(Ant4). Here, it is assumed that an uplink from UE1_510 to BS 530 is channel 1, and an uplink from UE2_520 to BS 530 is channel 2.

In the configuration according to this embodiment, the uplink MIMO channels formed by the reception antennas of the BS and the transmission antennas of UE1 and UE2 is characterized by channel response matrices $H_1$ and $H_2$ with 4 rows and 2 columns (4×2).

Uplink channel response matrices $\hat{H}_1$ and $\hat{H}_2$ are estimated by the BS based on the reference signals that are transmitted from the corresponding UEs. The singular value decomposition of the uplink channel response matrices $\hat{H}_1$ and $\hat{H}_2$ is represented by Equation (6) below.

(Equation 6)

$$\hat{H}_1 = \hat{U}_1 \hat{\Lambda}_1 \hat{V}_1^H \quad \hat{H}_2 = \hat{U}_2 \hat{\Lambda}_2 \hat{V}_2^H \tag{6}$$

Here, $\hat{U}_1$ is a unitary matrix with 4 rows and 4 columns (4×4) composed of left inherent vectors of $\hat{H}_1$, $\hat{\Lambda}_1$ is a diagonal matrix with 4 rows and 2 columns (4×2) composed of singular values of $\hat{H}_1$, and $\hat{V}_1$ is a unitary matrix with 2 rows and 2 columns (2×2) composed of right inherent vectors of $\hat{H}_1$. Also, $\hat{U}_2$ is a unitary matrix with 4 rows and 4 columns (4×4) composed of left inherent vectors of $\hat{H}_2$, $\hat{\Lambda}_2$ is a diagonal matrix with 4 rows and 2 columns (4×2) composed of singular values of $\hat{H}_2$, and $\hat{V}_2$ is a unitary matrix with 2 rows and 2 columns (2×2) composed of right inherent vectors of $\hat{H}_2$.

According to the exemplary embodiment of the invention, the precoding by the unitary matrix is applied to one of UEs, and a precoded channel response matrix is orthogonalized (or orthogonalized as much as possible) with respect to the channel response matrix of the one of UEs. That is, data symbols are spatially processed by selecting the precoded matrix P of the unitary matrix as for the one of UEs. Accordingly, the effective SDMA channel H is represented by Equation (7) below.

(Equation 7)

$$\tilde{H} = [H_1 H_2 P] \tag{7}$$

The orthogonality $\phi$ between UE1 and UE2 may be evaluated by an equation for obtaining a trace of an inner product of precoding matrices represented by Equation (8) below.

(Equation 8)

$$\Phi = tr(\hat{V}_2^H P \hat{V}_1) \tag{8}$$

In order to minimize the interference between users of UE1 and UE2, an optimum precoding matrix P is calculated by obtaining a minimum value that makes $\phi$ equal to or smaller than a predetermined value as in Equation (9) below.

(Equation 9)

$$P = \arg\min_{PP^H=I} \Phi = \arg\min_{PP^H=I} tr(\hat{V}_2^H P \hat{V}_1) \tag{9}$$

In the above-described channel optimization method, it is necessary to quantify the optimum precoding matrix P and to reply to the transmitter, and it follows that an important feedback band is used. In order to reduce the overhead of the feedback, in this embodiment of the invention, a method that is based on a code book is used to select the precoding matrix P.

According to the method based on the code book, the interference between users of UE1 and UE2 is minimized by selecting a precoding matrix with respect to one of paired UEs from one predetermined code book $C=\{C_1, C_2, C_L\}$ having a preset matrix group. Here, C includes L unitary matrices. In this case, the number L of unitary matrices selected from the code book C is optional, and for example, the number of DFTs may be used in signal processing. Next, using the selected precoding matrix $C_i$, the effective SDMA channel is represented by Equation (10) below.

(Equation 10)

$$\tilde{H} = [H_1, H_2 C_i] \tag{10}$$

Here, in order to minimize the interference between users of UE1 and UE2, the most preferable precoding matrix $P=C_i$ is selected from the state where $\phi$ is minimized as in Equation (11) below.

(Equation 11)

$$i = \underset{C_l \in C}{\arg\min} \, \Phi = \underset{C_l \in C}{\arg\min} \, tr(\hat{V}_2^H C_i \hat{V}_1) \quad (11)$$

In this case, using another scheduling and pairing policy, the code book may have different contents. As an example, it is also possible to randomly select a second UE by using the scheduling that performs random pairing for SDMA, that is, by scheduling the first operating UE by round robin or PF (Proportional Fairness). In this case, the unitary matrix based on L DFTs may be accommodated inside the code book C as in Equation (12) below.

(Equation 12)

$$\Phi_l = \Theta^{l-1} \Phi_0, \, l=1,\ldots,L \quad (12)$$

Here, the matrix $\Theta$ is represented by Equation (13) below.

(Equation 13)

$$\Theta = \begin{bmatrix} 1 & 0 & \cdots & 0 \\ 0 & \exp\left(\frac{j2\pi}{L}\right) & \cdots & \vdots \\ \vdots & \ddots & \ddots & 0 \\ 0 & \cdots & 0 & \exp\left(\frac{j(N-1)2\pi}{L}\right) \end{bmatrix} \quad (13)$$

Also, the matrix $\phi_0$ is represented by Equation (14) below.

(Equation 14)

$$\Phi_0 = \frac{1}{\sqrt{N}} \begin{bmatrix} 1 & 1 & \cdots & 1 \\ 1 & \exp\left(\frac{j2\pi}{N}\right) & \cdots & \exp\left(\frac{j(N-1)2\pi}{N}\right) \\ \vdots & \vdots & \ddots & \vdots \\ 1 & \exp\left(\frac{j(N-1)2\pi}{N}\right) & \cdots & \exp\left(\frac{j(N-1)(N-1)2\pi}{N}\right) \end{bmatrix} \quad (14)$$

The size of the code book $C\{C_i=\phi_1\}$ depends on a threshold value parameter $\lambda_1$ that indicates the orthogonal requisites between the paired UEs. That is, at least one element that satisfies Equation (15) may be found from the code book C having a size L for certain $\hat{V}_1$ and $\hat{V}_2$.

(Equation 15)

$$tr(V_2^H \Phi_i V_1 \leq \lambda_1) \quad (15)$$

In another embodiment of the invention, the scheduling of the orthogonal pairing is used in SDMA, that is, the orthogonal UE pair is first found, and then a pair is selected from the UE pair group based on the PF scheduling. It may be known that the selected UE pair satisfies Equation (16) below.

(Equation 16)

$$tr(V_2^H V_1 \leq \lambda_2) \quad (16)$$

Here, $\lambda_2$ is a threshold value parameter that means the orthogonal condition for pairing. In this case, a subset of the code book $\phi$ of the unitary matrix based on DFT may be used as the code book C. The size of the code book based on the code book (I) and the selection of the subset depend on both $\lambda_1$ and $\lambda_2$. Here, $\lambda_1$ indicates the final condition on the orthogonality between the paired UEs. That is, at least one element that satisfies Equation (17) may be found from the subset code book C for certain $\hat{V}_1$ and $\hat{V}_2$.

(Equation 17)

$$tr(\hat{V}_2^H C_i \hat{V}_1 \leq \lambda_1) \quad (17)$$

A specified code book may be found using statistical simulations, for example, such as $\lambda_1=0.05$, $\lambda_2=1.8$, and the code book $C\{C_i=\phi_1\}$ based on the DFT having a size of 16 may be a candidate code book.

Using the precoding method proposed in this embodiment of the invention, it is sufficient only if the BS feeds the selected precoding matrix or the index of the code book back to one of the paired UEs in order to notify the UE of the precoding matrix to be used in uplink transmission. For example, UE2 obtains two transmission symbols represented by Equation (18) below by spatially processing the data symbols using the precoding matrix P.

(Equation 18)

$$x_2 = Ps_2 \quad (18)$$

Accordingly, the received signal in the BS is represented by Equation (19) below.

(Equation 19)

$$Y = H_1 s_1 + H_2 P s_2 + W \quad (19)$$
$$= [H_1 \, H_2 P] S + W$$
$$= \overline{H} S + W$$

Here, the matrix S is represented by Equation (20) below.

(Equation 20)

$$S = \begin{bmatrix} s_1 \\ s_2 \end{bmatrix} \quad (20)$$

Also, the matrix $\overline{H}$ is an effective SDMA channel that is represented by Equation (21) below.

(Equation 21)

$$\overline{H} = [H_1 H_2 P] \quad (21)$$

As illustrated in FIG. 5, UE1_510 is provided with two transmission antennas 517a and 517b, UE2_520 is provided with two transmission antennas 527a and 527b, and BS 530 is provided with four reception antennas 531a to 531d. Using the uplink SDMA transmission, UE1 and UE2 simultaneously communicate with BS by the MU-MIMO.

UE1_510 includes a channel encoding unit 511, a symbol mapping unit 512, and a space multiplexing unit 513. In the same manner, UE2_520 includes a channel encoding unit 521, a symbol mapping unit 522, a space multiplexing unit 523, and a precoding unit 524. In UE1_510 and UE2_520, the function of the transmission unit is realized by an RF unit (not illustrated), transmission antennas 517a, 517b, 527a, and 527b, and the like.

In UE1_510, the channel encoding unit 511 encodes the input bit series 1 by performing error correction encoding of the input bit series 1, and the symbol mapping unit 512 obtains modulated symbols through modulation by a predetermined modulation method such as QPSK or 16 QAM. Then, the space multiplexing unit 513 generates two space streams S₁ and S₂ by performing a space multiplexing process with respect to the modulated symbols, and transmits the respective stream data through the transmission antennas 517*a* and 517*b*. In UE2_520, the channel encoding unit 521 encodes the input bit series 2 by performing error correction encoding of the input bit series 2, and the symbol mapping unit 522 obtains modulated symbols through modulation by a predetermined modulation method such as QPSK or 16 QAM. Then, the space multiplexing unit 523 generates two space streams S₃ and S₄ by performing a space multiplexing process with respect to the modulated symbols. Further, the precoding unit 524 performs precoding by applying the precoding matrix P with respect to the space streams S₃ and S₄, and transmits the respective stream data through the transmission antennas 527*a* and 527*b*.

The space streams transmitted from the respective UEs are simultaneously received by the reception antennas 531*a* to 531*d* of the BS through the corresponding MIMO channels. The BS 530 includes a channel estimation and precoding selection unit 539, a MIMO detection unit 532, demultiplexing units 533 and 534, demapping units 535 and 536, and decoding units 537 and 538.

In the BS 530, the reception antennas 531*a* to 531*d* and an RF unit (not illustrated) realize the function of the reception unit. Also, the MIMO detection unit 532 realizes the function of the signal separation unit. Also, the demultiplexing units 533 and 534, the demapping units 535 and 536, and the decoding units 537 and 538 realize the function of the decoding unit. Also, the channel estimation and precoding selection unit 539 has the functions of the channel estimation unit, the scheduling unit, the precoding selection unit, and the control information notification unit.

In the BS 530, the channel estimation and precoding selection unit 539 estimates channel response matrices of all operating UEs by performing propagation path estimation using reference signals received through the reception antennas 531*a* to 531*d*. Also, the channel estimation and precoding selection unit 539 outputs the result of the propagation path estimation to the MIMO detection unit 532 as the channel matrices. Also, the channel estimation and precoding selection unit 539 performs the selection of the precoding matrix P based on the scheduling policy and the above-described precoding method, outputs precoding information PMI that indicates the selected precoding matrix P, and feeds the precoding information PMI back to UE2_520 that is one of the scheduled UE pair.

Also, the MIMO detection unit 532 detects and separates the data streams from other UEs by performing the MIMO separation process using the channel matrices with respect to data signals r₁, r₂, r₃, and r₄ of the signals received through the reception antennas, and obtains streams after separation S^₁, S^₂, S^₃, and S^₄. Thereafter, the demultiplexing units 533 and 534, which perform the opposite process to the space multiplexing units 513 and 523, change the separately detected streams to one symbol series, and the demapping units 535 and 536, which perform the opposite process to the symbol mapping units 512 and 522, perform a demodulation process in the unit of a symbol. Then, the decoding units 537 and 538, which perform the opposite process to the channel encoding unit 511, perform an error-correction decoding process, and realize and output the output bit series 1 and 2 transmitted from UE1 and UE2.

Figure 6:
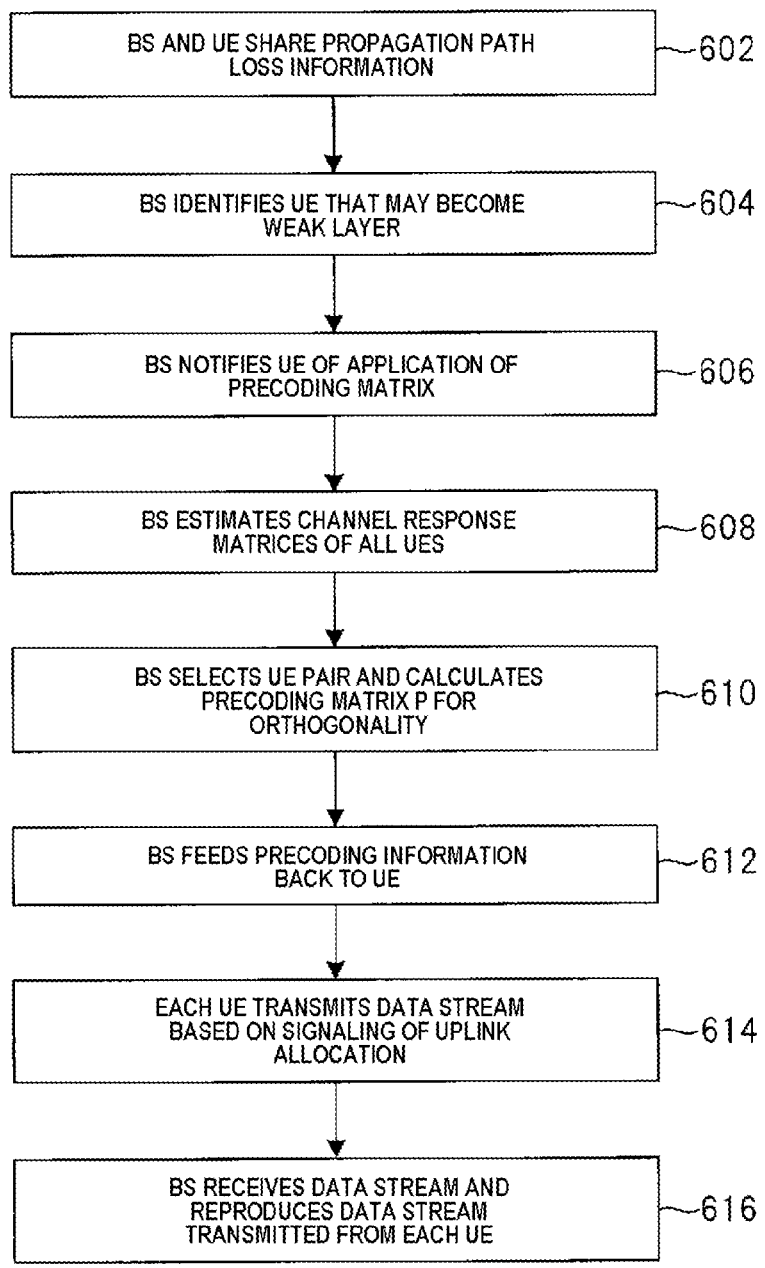
FIG. 6 is a flowchart illustrating an operational procedure in the first exemplary embodiment of the invention.

FIG. 6 is a flowchart illustrating an operational procedure in the first exemplary embodiment of the invention, and exemplifies a method of executing MU-MIMO transmission in an uplink for SDMA. First, in step 602, BS and UE share propagation path loss information on the corresponding channels. Then, in step 604, the BS identifies which UE may become a weak layer based on the propagation path loss that is adjusted using a parameter of an SRS (Sounding Reference Signal). Then, in step 606, the BS determines to apply a precoding matrix by a projection matrix to one of the UEs which becomes a strong layer in the case where the UE pair is formed, and notifies the UE of the execution of the precoding.

In step 608, the BS estimates the channel response matrix using the SRS with respect to the all operating UEs. Next, in step 610, the BS selects the UE pair according to the scheduling policy, and calculates or selects from the code book the corresponding precoding matrix P that will orthogonalize or orthogonalize as much as possible the channel response matrix of the paired UEs. Then, in step 612, the BS feeds the precoding information that instructs the precoding matrix P back to one of the UEs that becomes a strong layer. Thereafter, in step 614, the respective UEs generate and transmit data streams based on the signaling of the corresponding uplink allocation including information on the precoding matrix and the transmission rate. Last, in step 616, the BS performs the MU-MIMO detection by receiving the data streams transmitted from the respective UEs, and obtains reproduced data streams from the respective UEs of the selected UE pair.

Figure 7:
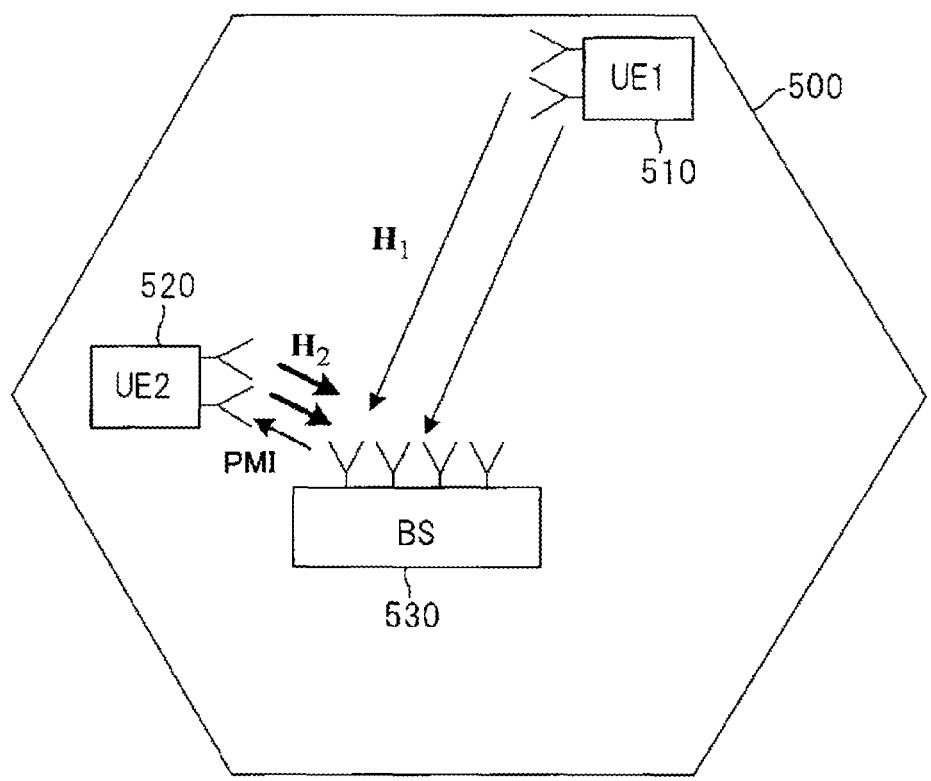
FIG. 7 is a diagram illustrating the brief configuration of an MU-MIMO system that corresponds to the configuration example of the first exemplary embodiment.

Here, the effect of reducing the interference between users according to this embodiment of the invention will be described. FIG. 7 is a diagram illustrating the brief configuration of an MU-MIMO system that corresponds to the configuration example of the first exemplary embodiment illustrated in FIG. 5. Here, in the MU-MIMO system 500, a case where UE1_510 that is a weak layer and UE2_520 that is a strong layer perform the MU-MIMO transmission of 2×4 uplink with respect to the BS 530 is illustrated.

In this case, an uplink channel response matrix between UE1_510 and BS 530 is H₁, an uplink channel response matrix between UE2_520 and BS 530 is H₂, and the BS feeds precoding information PMI that instructs a precoding matrix P back to one of UE2_520. In this embodiment, by applying the precoding matrix P only to one of UEs that is a strong layer, it is possible to maintain the orthogonality between the UEs and to reduce the interference between users. In this case, since it is sufficient if information that instructs the precoding matrix P is fed back to one of the UEs only, the increase of the signaling overhead can be suppressed.

Figure 8:
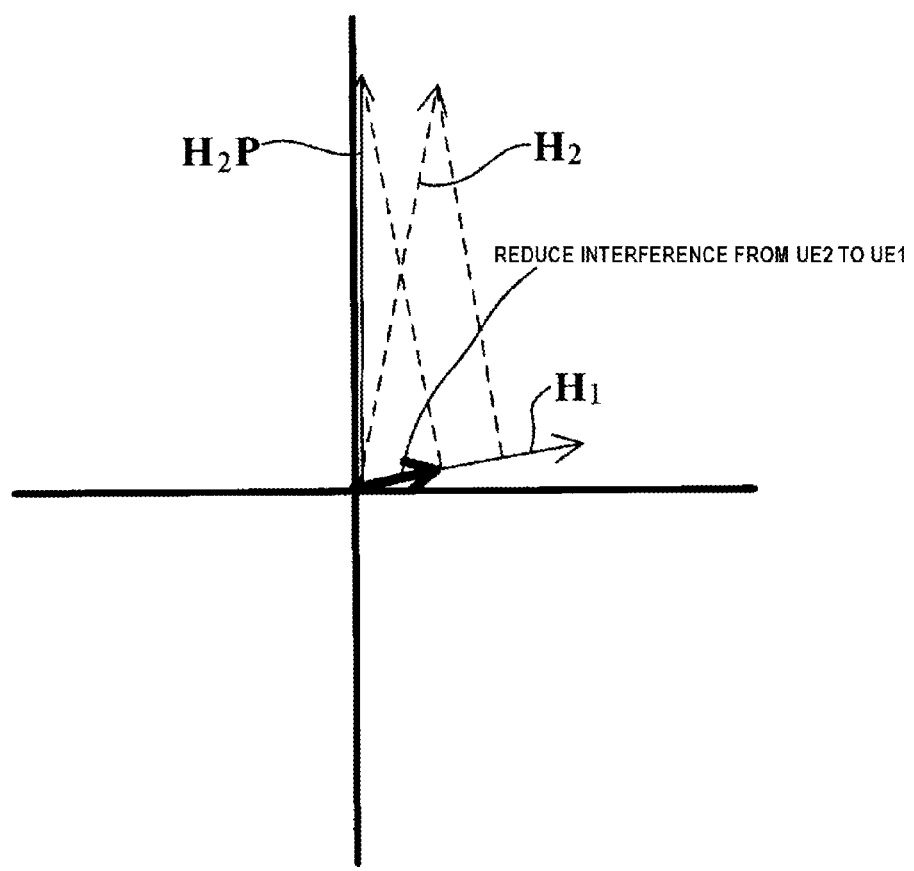
FIG. 8 is a schematic diagram two-dimensionally illustrating uplink channel response matrices between respective UEs and a BS in the configuration example of the first exemplary embodiment.

FIG. 8 is a schematic diagram two-dimensionally illustrating uplink channel response matrices between the respective UEs and the BS in the configuration example of the first embodiment of the invention illustrated in FIG. 5. In this example, the channel matrix, which is actually a four-dimensional space, is schematically illustrated in two dimensions for simplicity. The actual four-dimensional space is not accurately indicated. In FIG. 8, the respective channel matrices are indicated by vectors, and the length of the vector indicates power (that is, SINR). The projection vectors from the uplink channel response matrix of one of the UEs to the uplink channel response matrix of the other side of the UEs indicate the interference between the UEs. In this case, even in a state where the power balance of the uplink channel response matrices H₁ and H₂ of the UE pair is not found, that is, even in a combination of UE1_510 that is a weak layer and UE2_520 that is a strong layer as illustrated in FIG. 7, the channel response matrices H₁ and H₂P can be orthogonalized or orthogonalized as much as possible by multiplying the uplink channel response matrix H₂ of one of the UEs by the precoding matrix P. Accordingly, the interference from UE2 to UE1 is reduced, and thus the deterioration of the communication quality of the system can be suppressed. Also, in this case, the possibility of UE pair selection is maintained high without complicating the scheduling process, and thus the multiplexing gain can be improved.

For example, in order to maintain the orthogonality of the uplink channel response matrix between the UEs, the precoding matrix can be minutely set, and thus in the case of feeding back the precoding information having high granularity, the information amount of signaling that is fed back to the respective UEs is increased. By contrast, in this embodiment of the invention, the possible orthogonality is maintained by applying the procoding matrix P by the projection matrix of a simple unitary matrix only to one of the UEs, and thus it is sufficient only if the precoding information is fed back to one of the UEs. Accordingly, the precoding for orthogonalizing the UE pair can be realized with smaller signaling information amount, and the selection of the UE pair is facilitated.

In this embodiment, particularly in the case where a great difference in power exists between the paired UEs, such as in the case where UE that is a weak layer at the end of the cell and UE that is a strong layer in the center of the cell are paired, more remarkable effect can be obtained. In this case, it is sufficient only if the precoding matrix P of the projection matrix is applied only to one of UEs that is a strong layer and the precoding information is notified only to the corresponding UE to perform the precoding. Here, since each UE transmits the plurality of space-multiplexed data streams through a plurality of transmission antennas, an effective precoding for maintaining the orthogonality can be obtained by the projection matrix having the unitary characteristic.

Second Embodiment

Figure 9:
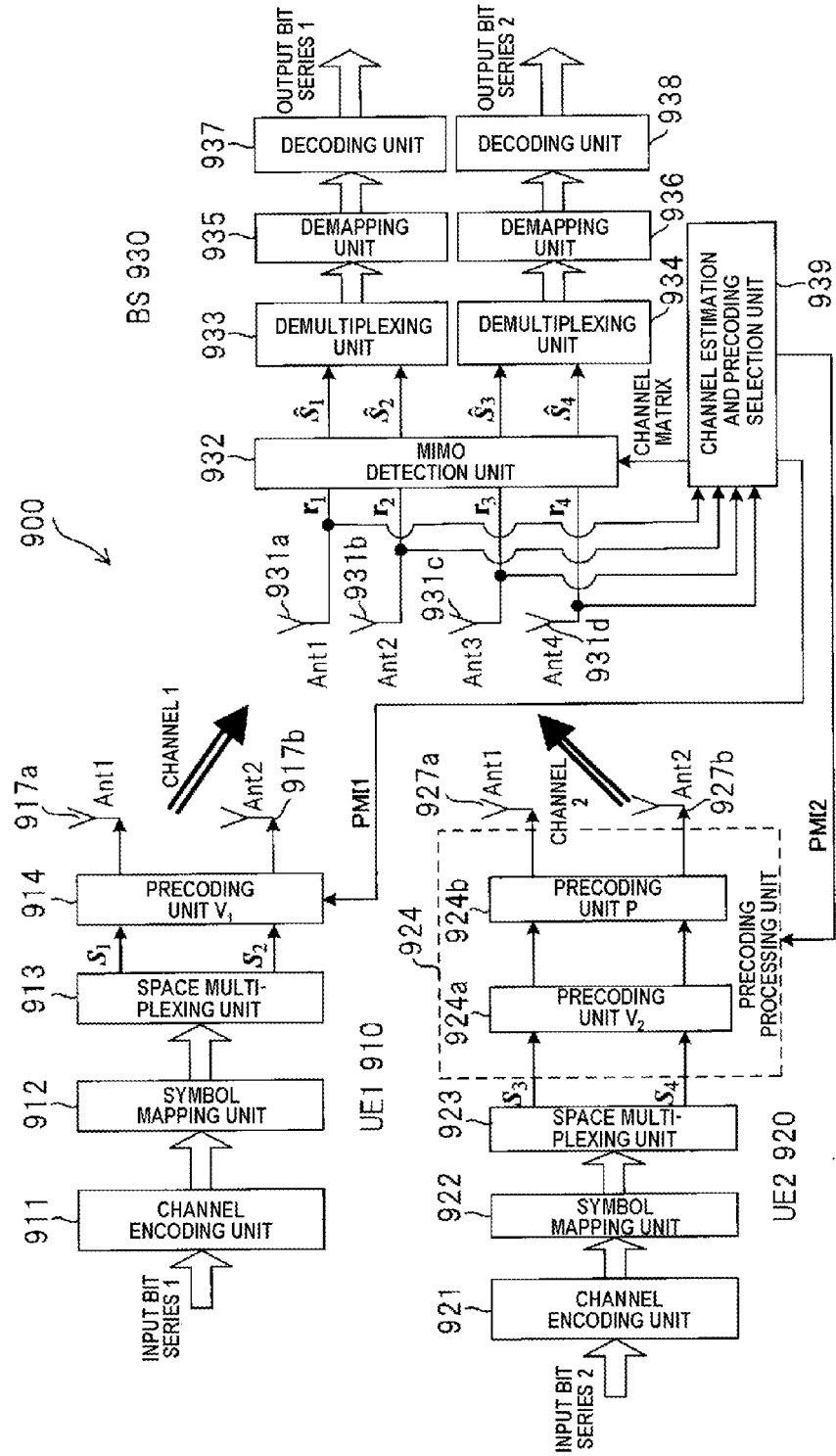
FIG. 9 is a block diagram illustrating a second example of the configuration of a wireless communication system that uses a cellular wireless communication network as a second exemplary embodiment of the invention.

FIG. 9 is a block diagram illustrating a second example of the configuration of a wireless communication system that uses a cellular wireless communication network as a second exemplary embodiment of the invention. The second embodiment is obtained by changing a part of the first embodiment as described above. In the second embodiment of the invention, in order to minimize both the interference between the UEs and the interference between space streams in one UE, a combination of the precoding according to this embodiment and the precoding in the related art is adopted. That is, in addition to the use of the precoding matrix V in the configuration example of FIG. 2 as described above, spatial processing of the data symbols is further executed through selection of the precoding matrix P of the additional unitary matrix according to the first embodiment with respect to one of the UEs.

Using the precoding method according to this embodiment, the BS feeds the selected precoding matrix or the index of the code book back to the UE with respect to the precoding matrix V, and feeds the selected precoding matrix or the index of the code book back to one of the paired UEs with respect to the precoding matrix P. For example, UE2 spatially processes the data symbols using the precoding matrix P, and two transmission symbols as represented by Equation (22) below are obtained.

(Equation 22)

$$x_2 = \hat{V}_2 P s_2 \quad (22)$$

Accordingly, a received signal in the BS is represented by Equation (23) below.

(Equation 23)

$$Y = H_1 \hat{V}_1 s_1 + H_2 \hat{V}_2 P s_2 + W \quad (23)$$
$$= [H_1 \hat{V}_1 \ H_2 \hat{V}_2 P] S + W$$
$$= \overline{HS} + W$$

Here, a matrix S is represented by Equation (24) below.

(Equation 24)

$$S = \begin{bmatrix} s_1 \\ s_2 \end{bmatrix} \quad (24)$$

Also, a matrix $\overline{H}$ is an effective SDMA channel represented by Equation (25) below.

(Equation 25)

$$\overline{H} = [H_1 \hat{V}_1 H_2 \hat{V}_2 P] \quad (25)$$

As illustrated in FIG. 9, an MU-MIMO system 900 according to the second embodiment includes UE1_910 that is a first user equipment, UE2_920 that is a second user equipment, and BS 930 that is a base station. UE1_910 is provided with two transmission antennas 917a and 917b, UE2_920 is provided with two transmission antennas 927a and 927b, and BS 930 is provided with four reception antennas 931a to 931d. Using the uplink SDMA transmission, by the MU-MIMO, UE1 and UE2 simultaneously communicate with BS by transmitting the space-multiplexed data streams to BS through the two transmission antennas, respectively.

UE1_910 includes a precoding unit 914 that applies a precoding matrix $V_1$ in addition to a channel encoding unit 911, a symbol mapping unit 912, and a space multiplexing unit 913. UE2_920 includes a precoding processing unit 924 having a first precoding unit 924a that applies a precoding matrix $V_2$ and a second precoding unit 924b that applies a precoding matrix P in addition to a channel encoding unit 921, a symbol mapping unit 922, and a space multiplexing unit 923.

In UE1_910, the channel encoding unit 911 encodes the input bit series 1, and the symbol mapping unit 912 obtains modulated symbols through modulation. Also, the space multiplexing unit 913 generates two space streams $S_1$ and $S_2$ by performing a space multiplexing process with respect to the modulated symbols. Then, the precoding unit 914 performs precoding of the space streams $S_1$ and $S_2$ by applying the precoding matrix $V_1$, and transmits the respective stream data through the transmission antennas 917a and 917b. In UE2_920, the channel encoding unit 921 encodes the input bit series 2, and the symbol mapping unit 922 obtains modulated symbols through modulation. Then, the space multiplexing unit 923 generates two space streams $S_3$ and $S_4$ by performing a space multiplexing process with respect to the modulated symbols. Further, the first precoding unit 924a of the precoding unit 924 performs precoding by applying the precoding matrix $V_2$ to the space streams $S_3$ and $S_4$, and the second precoding unit 924b performs precoding by applying the precoding matrix P to the space streams $S_3$ and $S_4$. The first and second precoding units 924a and 924b transmit the respective stream data through the transmission antennas 927a and 927b.

The space streams transmitted from the respective UEs are simultaneously received by the reception antennas 931a to 931d of the BS through the corresponding MIMO channels. The BS 930 includes a channel estimation and precoding selection unit 939, a MIMO detection unit 932, demultiplexing units 933 and 934, demapping units 935 and 936, and decoding units 937 and 938.

In the BS 930, the channel estimation and precoding selection unit 939 estimates channel response matrices of all operating UEs by performing propagation path estimation using reference signals received through the reception antennas 931a to 931d. Also, the channel estimation and precoding selection unit 939 outputs the result of the propagation path estimation to the MIMO detection unit 932 as the channel matrices. Also, the channel estimation and precoding selection unit 939 performs the selection of the precoding matrices V and P based on the scheduling policy and the above-described precoding method. Also, the channel estimation and precoding selection unit 939 feeds information that indicates the selected precoding matrix V back to both the scheduled UEs of the UE pair, and feeds information that indicates the selected precoding matrix P back to one of the scheduled UE pair. That is, the channel estimation and precoding selection unit 939 feeds the precoding information PMI1 that instructs the precoding matrix $V_1$ back to UE1_910, and feeds the precoding information PMI2 that instructs the precoding matrices $V_2$ and P back to UE2_920.

Also, the MIMO detection unit 932 detects and separates the data streams from other UEs by performing the MIMO separation process using the channel matrices with respect to data signals $r_1, r_2, r_3$, and $r_4$ of the signals received through the reception antennas, and obtains streams after separation $\hat{S}_1$, $\hat{S}_2, \hat{S}_3$, and $\hat{S}_4$. Thereafter, the demultiplexing units 933 and 934 change the separately detected streams to one symbol series, and the demapping units 935 and 936 perform a demodulation process in the unit of a symbol. Then, the decoding units 937 and 938 perform an error-correction decoding process, and realize and output the output bit series 1 and 2 transmitted from UE1 and UE2.

Figure 10:
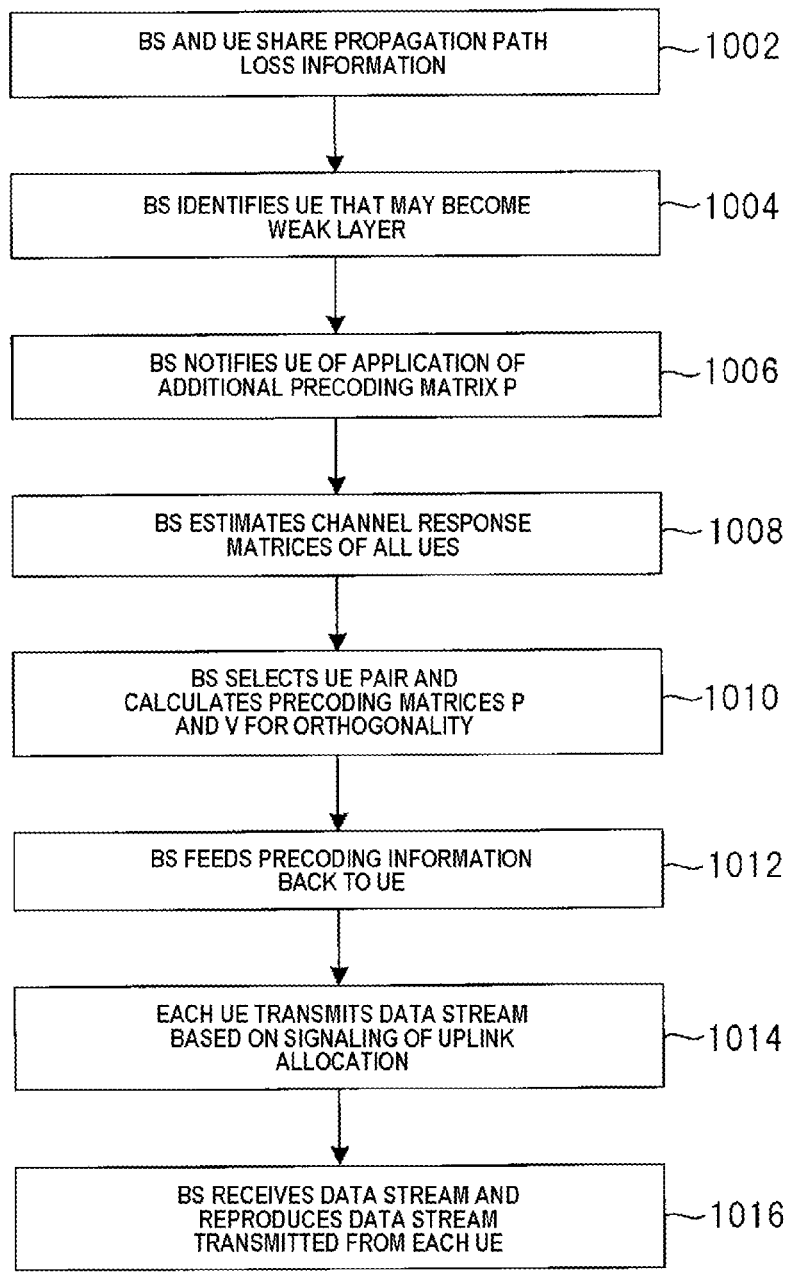
FIG. 10 is a flowchart illustrating an operational procedure in the second exemplary embodiment of the invention.

FIG. 10 is a flowchart illustrating an operational procedure in the second exemplary embodiment of the invention, and exemplifies a method of executing MU-MIMO transmission in an uplink for SDMA. First, in step 1002, BS and UE share propagation path loss information on the corresponding channels. Then, in step 1004, the BS identifies which UE may become a weak layer based on the propagation path loss that is adjusted using a parameter of the SRS. Then, in step 1006, the BS determines to apply an additional precoding matrix P by a projection matrix to one of the UEs which becomes a strong layer in the case where the UE pair is formed, and notifies the UE of the execution of the precoding.

In step 1008, the BS estimates the channel response matrix using the SRS with respect to the whole operating UEs. Next, in step 1010, the BS selects the UE pair according to the scheduling policy, and calculates or selects from the code book the corresponding precoding matrices P and V that will orthogonalize or orthogonalize as much as possible the channel response matrix of the paired UEs. Then, in step 1012, BS feeds the precoding matrix V back to both the UE pair and feeds precoding information that instructs the precoding matrix P back to one of the UEs. Then, in step 1014, the respective UEs generate and transmit data streams based on the signaling of the corresponding uplink allocation including information on the precoding matrix and the transmission rate. Last, in step 1016, the BS performs the MU-MIMO detection by receiving the data streams transmitted from the respective UEs, and obtains reproduced data streams from the respective UEs of the selected UE pair.

As described above, even in the case of performing the precoding with respect to both the UEs of the UE pair, by combining the precoding that applies the projection matrix with respect to one of the UEs to secure the orthogonality, the interference between the UEs is reduced without increasing the scheduling overhead. Also, in this case, the possibility of UE pair selection is maintained high without complicating the scheduling process, and thus the multiplexing gain can be improved.

Third Embodiment

Figure 11:
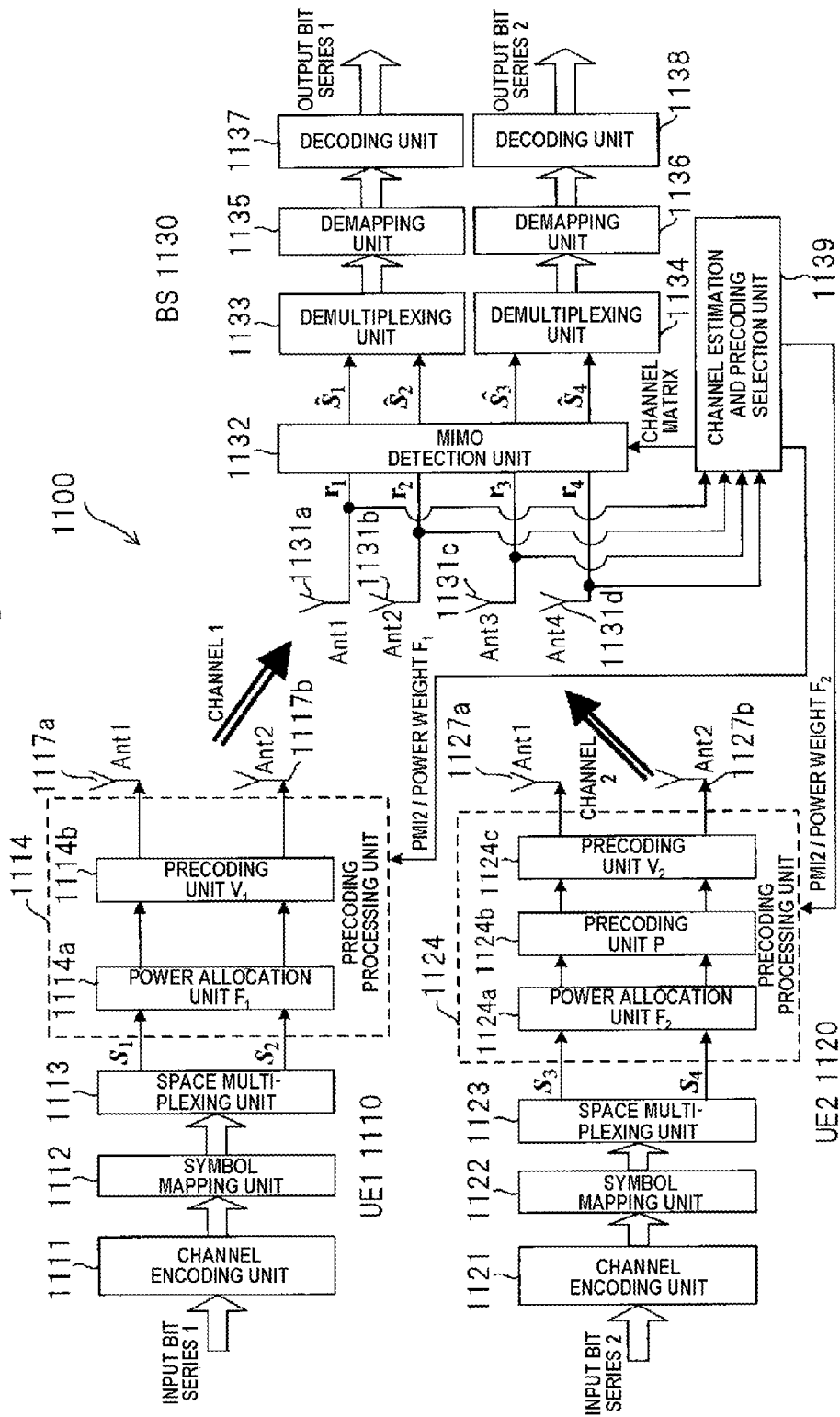
FIG. 11 is a block diagram illustrating a third example of the configuration of a wireless communication system that uses a cellular wireless communication network as a third exemplary embodiment of the invention.

FIG. 11 is a block diagram illustrating a third example of the configuration of a wireless communication system that uses a cellular wireless communication network as a third exemplary embodiment of the invention. The third embodiment is obtained by changing a part of the first and second embodiments as described above, and hereinafter, explanation will be made around the points that are different from those in the first and second embodiments. In the third embodiment of the invention, in order to minimize the interference between the UEs and to optimally allocate power weights of power control to the respective UEs, a combination of the precoding according to this embodiment and the power control is adopted. In this case, by applying the power control method that makes target SINRs of the respective users who perform the pairing differ from each other, the gain by the precoding of the proposed method can be increased. That is, the precoding matrix V in the second configuration example as described above is used simultaneously with allocation of power weights F to the respective UEs, and the spatial process of data symbols is further executed through selection of the precoding matrix P of the additional unitary matrix according to the first embodiment with respect to one of the UEs.

Using the precoding method according to this embodiment, the BS feeds the allocated power weight F and the precoding matrix selected with respect to the precoding matrix V or the index of the code book back to the respective UEs, and feeds the selected precoding matrix or the index of the code book back to one of the paired UEs with respect to the precoding matrix P. Also, UE1 and UE2 spatially process the respective data symbols using the corresponding precoding matrix V and the power weight F. Here, UE2 performs insertion of an additional precoding matrix P in the spatial process. That is UE1 and UE2 obtain two transmission symbols as represented by Equation (26) below.

(Equation 26)

$$x_1 = \hat{V}_1 F_1 s_1, x_2 = \hat{V}_2 P F_2 s_2 \tag{26}$$

Here, F1 and F2 represent diagonal matrices of which the diagonal elements indicate power weights for the respective streams.

Accordingly, a received signal in the BS is represented by Equation (27) below.

(Equation 27)

$$\begin{aligned} Y &= H_1 \hat{V}_1 F_1 s_1 + H_2 \hat{V}_2 P F_2 s_2 + W \\ &= [H_1 \hat{V}_1 F_1 \ H_2 \hat{V}_2 P F_2] S + W \\ &= \overline{HS} + W \end{aligned} \tag{27}$$

Here, a matrix S is represented by Equation (28) below.

(Equation 28)

$$S = \begin{bmatrix} s_1 \\ s_2 \end{bmatrix} \quad (28)$$

Also, a matrix H⁻ is an effective SDMA channel represented by Equation (29) below.

(Equation 29)

$$\bar{H} = [H_1 \hat{V}_1 F_1 H_2 \hat{V}_2 P F_2] \quad (29)$$

As illustrated in FIG. 11, an MU-MIMO system 1100 according to the third embodiment includes UE1_1110 that is a first user equipment, UE2_1120 that is a second user equipment, and BS 1130 that is a base station. UE1_1110 is provided with two transmission antennas 1117a and 1117b, UE2_1120 is provided with two transmission antennas 1127a and 1127b, and BS 1130 is provided with four reception antennas 1131a to 1131d. Using the uplink SDMA transmission, by the MU-MIMO, UE1 and UE2 simultaneously communicate with BS by transmitting the space-multiplexed data streams to BS through the two transmission antennas, respectively.

UE1_1110 includes a precoding processing unit 1114 having a power allocation unit 1114a that allocates power of the terminal based on transmitted power distribution between UEs and a precoding unit 1114b that applies a precoding matrix $V_1$ in addition to a channel encoding unit 1111, a symbol mapping unit 1112, and a space multiplexing unit 1113. UE2_1120 includes a precoding processing unit 1124 having a power allocation unit 1124a that allocates power of the terminal based on transmitted power distribution between UEs, a first precoding unit 1124b that applies a precoding matrix $V_2$, and a second precoding unit 1124c that applies a precoding matrix P in addition to a channel encoding unit 1121, a symbol mapping unit 1122, and a space multiplexing unit 1123.

In UE1_1110, the channel encoding unit 1111 encodes the input bit series 1, and the symbol mapping unit 1112 obtains modulated symbols through modulation. Also, the space multiplexing unit 1113 generates two space streams $S_1$ and $S_2$ by performing a space multiplexing process with respect to the modulated symbols. Thereafter, the power allocation unit 1114a of the precoding processing unit 1114 performs power allocation with respect to the space streams $S_1$ and $S_2$ by multiplying the power weight $F_1$, and then the precoding unit 1114b performs precoding of the space streams $S_1$ and $S_2$ by applying the precoding matrix $V_1$, and transmits the respective stream data through the transmission antennas 1117a and 1117b. In UE2_1120, the channel encoding unit 1121 encodes the input bit series 2, and the symbol mapping unit 1122 obtains modulated symbols through modulation. Then, the space multiplexing unit 1123 generates two space streams $S_3$ and $S_4$ by performing a space multiplexing process with respect to the modulated symbols. Further, the power allocation unit 1124a of the precoding processing unit 1124 performs power allocation with respect to the space streams $S_3$ and $S_4$ by multiplying the power weight $F_2$, and then the first precoding unit 1124b performs precoding by applying the precoding matrix $V_2$ to the space streams $S_3$ and $S_4$, and the second precoding unit 1124c performs precoding by applying the precoding matrix P to the space streams $S_3$ and $S_4$ to transmit the respective stream data through the transmission antennas 1127a and 1127b.

The space streams transmitted from the respective UEs are simultaneously received by the reception antennas 1131a to 1131d of the BS through the corresponding MIMO channels.

The BS 1130 includes a channel estimation and precoding selection unit 1139, a MIMO detection unit 1132, demultiplexing units 1133 and 1134, demapping units 1135 and 1136, and decoding units 1137 and 1138. In the third embodiment of the invention, the channel estimation and precoding selection unit 1139 has functions of the channel estimation unit, the scheduling unit, the precoding selection unit, the control information notification unit, and the power weight determination unit.

In the BS 1130, the channel estimation and precoding selection unit 1139 estimates channel response matrices of all operating UEs and the channel qualities by performing propagation path estimation using reference signals received through the reception antennas 1131a to 1131d. Also, the channel estimation and precoding selection unit 1139 outputs the result of the propagation path estimation to the MIMO detection unit 1132 as the channel matrices. Also, the channel estimation and precoding selection unit 1139 determines the power allocation of the respective UEs by performing the transmitted power distribution between the UEs based on the estimated channel response matrix and the channel qualities, and calculates the power weights F for the respective UEs. Further, the channel estimation and precoding selection unit 1139 performs the selection of the precoding matrices V and P based on the scheduling policy and the above-described precoding method. Also, the channel estimation and precoding selection unit 1139 feeds information that indicates the power weights F and the selected precoding matrix V back to both the scheduled UEs of the UE pair, and feeds information that indicates the selected precoding matrix P back to one of the scheduled UEs. That is, the channel estimation and precoding selection unit 1139 feeds the precoding information PMI1 that instructs the power weights $F_1$ that indicate the power allocation and the precoding matrix $V_1$ back to UE1_1110, and feeds the precoding information PMI2 that instructs the power weights $F_2$ that indicate the power allocation and the precoding matrices $V_2$ and P back to UE2_1120.

Also, the MIMO detection unit 1132 detects and separates the data streams from other UEs by performing the MIMO separation process using the channel matrices with respect to data signals $r_1, r_2, r_3,$ and $r_4$ of the signals received through the reception antennas, and obtains streams after separation $\hat{S}_1$, $\hat{S}_2, \hat{S}_3,$ and $\hat{S}_4$. Thereafter, the demultiplexing units 1133 and 1134 change the separately detected streams to one symbol series, and the demapping units 1135 and 1136 perform a demodulation process in the unit of a symbol. Then, the decoding units 1137 and 1138 perform an error-correction decoding process, and realize and output the output bit series 1 and 2 transmitted from UE1 and UE2.

FIG. 12 is a flowchart illustrating an operational procedure in the third exemplary embodiment of the invention, and exemplifies a method of executing MU-MIMO transmission in an uplink for SDMA. First, in step 1202, BS and UE share propagation path loss information on the corresponding channels. Then, in step 1204, the BS identifies which UE may become a weak layer based on the propagation path loss that is adjusted using a parameter of the SRS. Then, in step 1206, the BS determines to apply an additional precoding matrix P by a projection matrix to one of the UEs which becomes a strong layer in the case where the UE pair is formed, and notifies the UE of the execution of the precoding.

In step 1208, the BS estimates the channel response matrix and the channel qualities using the SRS with respect to the whole operating UEs. Next, in step 1210, the BS calculates the power weights F of the respective UEs by performing the transmitted power distribution between the UEs based on the channel response matrix and the channel qualities. Next, in step 1212, the BS selects the UE pair according to the scheduling policy, and calculates or selects from the code book the corresponding precoding matrices P and V that will orthogonalize or orthogonalize as much as possible the channel response matrix of the paired UEs. Then, in step 1214, the BS feeds the power weights F back to the respective UEs and feeds the precoding matrix V back to both the UEs of the UE pair and feeds the precoding information that instructs the precoding matrix P back to one of the UEs. Then, in step 1216, the respective UEs generate and transmit data streams based on the signaling of the corresponding uplink allocation including information on the power weights, the precoding matrix, and the transmission rate. Last, in step 1218, the BS performs the MU-MIMO detection by receiving the data streams transmitted from the respective UEs, and obtains reproduced data streams from the respective UEs of the selected UE pair.

As described above, in the case of performing the transmitted power distribution in the plurality of UEs, by combining the precoding that applies the projection matrix with respect to one of the UEs to secure the orthogonality, the interference between the UEs is reduced without increasing the scheduling overhead. In particular, if there is a difference in target SINR between the paired UEs and there is a great difference in power due to the power control, the precoding effect according to this embodiment is further increased, and thus a great gain can be obtained in the MU-MIMO.

In the precoding process according to the above-described embodiments, the precoding matrix V is not inevitably necessary, and only the precoding matrix P for orthogonalizing or orthogonalizing as much as possible between the paired UEs may be applied.

As described above, according to the embodiments, by applying a precoding matrix of a simple projection matrix only to one of the paired UEs, the influence on the overhead of signaling for performing feedback of control information is minimized. This is because only the overhead of signaling for providing a code book having precise granularity to one of the paired UEs is necessary. Also, by applying the precoding matrix of the projection matrix to one of the paired UEs, the orthogonality of the channel response matrices of the UE pair can be maintained and the interference between users of the UEs can be reduced to make the performance of MU-MIMO robust. Also, by increasing the possibility of scheduling of the UE pair in the SDMA, the complexity of the scheduling processing can be suppressed to improve the multiplexing gain.

The present invention is not limited to the embodiments as described above, and those skilled in the art will appreciate that various modifications and application are possible based on the description and the known technology, which are included in a range that requires protection.

The number of UEs (the number of terminals in a pair of UEs selected for SDMA) that constitute the MU-MIMO system, the number of transmission antennas of each UE, and the number of reception antennas of BS are not limited to those in above-described embodiments, and it is possible to appropriately set and apply the numbers that are equal to or larger than two in the present invention.

In the above-described embodiments, it is exemplified that the present invention is configured by hardware. However, it is also possible to implement the present invention by software.

Also, respective function blocks used in describing the respective embodiments are typically implemented by an LSI that is an integrated circuit. These blocks may be individually integrated into one chip or a portion or the whole portion of the blocks may be integrated into one chip. Here, although an LSI is exemplified, it may be called an IC, a system LSI, a super LSI, or an ultra LSI according to the difference in integration.

Also, the technique of circuit integration is not limited to the LSI, and the function blocks may be implemented by dedicated circuits or a general-purpose processor. After manufacturing the LSI, a FPGA (Field programmable Gate Array) or a reconfigurable processor, which can reconfigure the connection or setting of circuit cells in the LSI, may be used.

Further, if a circuit integration technique that replaces the LSI appears with the progress of semiconductor technology or other derivative technology, the integration of the function blocks may be performed using the technique. There may be a possibility of adopting bio technology.

This application is based on Japanese Patent Application (No. 2008-242703) filed on Sep. 22, 2008, the content of which is incorporated herein by reference in its entirety.

INDUSTRIAL APPLICABILITY

The present invention is useful as a wireless communication apparatus, a wireless communication system, and a wireless communication method in a cellular communication system that uses a MIMO system that performs communication using a plurality of antennas, which can minimize the interference between users by the effective precoding without increasing the overhead of control information in an MU-MIMO system.

REFERENCE SIGNS LIST

100, 500: MU-MIMO system
102: BS (Base Station)
104, 106: UE (User equipment)
510, 910, 1110: UE1
520, 920, 1120: UE2
511, 521, 911, 921, 1111, 1121: channel encoding unit
512, 522, 912, 922, 1112, 1122: symbol mapping unit
513, 523, 913, 923, 1113, 1123: space multiplexing unit
517a, 517b, 527a, 527b, 917a, 917b, 927a, 927b, 1117a, 1117b, 1127a, 1127b: transmission antenna
524, 914, 924, 1114, 1124: precoding unit
530: BS
531a, 531b, 531c, 531d, 931a, 931b, 931c, 931d, 1131a, 1131b, 1131c, 1131d: reception antenna
532, 932, 1132: MIMO detection unit
533, 534, 933, 934, 1133, 1134: demultiplexing unit
535, 536, 935, 936, 1135, 1136: demapping unit
537, 538, 937, 938, 1137, 1138: decoding unit
539, 939, 1139: channel estimation and precoding selection unit

The invention claimed is:

1. A wireless communication apparatus of a base station used in a wireless communication system that can perform multiplex communication between a plurality of user equipments and the base station, the wireless communication apparatus comprising:
   a channel estimation unit performs channel estimation of a propagation path from the user equipment to the wireless communication apparatus;

a scheduling unit selects a pair of user equipments that perform the multiplex communication based on a result of the channel estimation;

a precoding selection unit determines a precoding matrix of a projection matrix to make channel response matrices of respective user equipments orthogonal or almost orthogonal to each other in the selected pair of user equipments, wherein the precoding matrix applied to the channel response matrix of a one user equipment of the selected pair of user equipments in order to maintain the orthogonality of the channel response matrices of the selected pair of user equipments;

a control information notification unit feeds back control information that includes precoding information that indicates the determined precoding matrix to the corresponding user equipments;

a reception unit receives data transmitted from the respective user equipments of the selected pair of user equipments through a plurality of reception antennas;

a signal separation unit separates the received data to detect a plurality of streams; and a decoding unit decodes reception data from the plurality of detected streams.

2. The wireless communication apparatus according to claim 1, wherein the reception unit receives data from the user equipments that transmit a plurality of space-multiplexed streams through a plurality of transmission antennas, and the precoding selection unit determines the precoding matrix of the projection matrix in order to make the channel response matrices of the respective user equipments that transmit the plurality of streams orthogonal or almost orthogonal to each other.

3. A wireless communication apparatus of a base station used in a wireless communication system that can perform multiplex communication between a plurality of user equipments and the base station, the wireless communication apparatus comprising:

a channel estimation unit performs channel estimation of a propagation path from the user equipment to the wireless communication apparatus;

a scheduling unit selects a pair of user equipments that perform the multiplex communication based on a result of the channel estimation;

a precoding selection unit determines a precoding matrix of a projection matrix that is applied to a channel response matrix of one user equipment in order to make channel response matrices of the respective user equipments orthogonal or almost orthogonal to each other in the selected pair of user equipments;

a control information notification unit feeds back control information that includes precoding information that indicates the determined precoding matrix to the corresponding user equipments;

a reception unit receives data transmitted from the respective user equipments of the selected pair of user equipments through a plurality of reception antennas;

a signal separation unit separates the received data to detect a plurality of streams; and a decoding unit decodes reception data from the plurality of detected streams, wherein the precoding selection unit determines the precoding matrix by calculating a unitary matrix which makes a trace of an inner product of the precoding matrix that is applied to the respective user equipments in the pair of user equipments equal to or smaller than a predetermined value based on the channel response matrices of the user equipments or selecting the unitary matrix from a code book having a preset matrix group.

4. A wireless communication apparatus of a base station used in a wireless communication system that can perform multiplex communication between a plurality of user equipments and the base station, the wireless communication apparatus comprising:

a channel estimation unit performs channel estimation of a propagation path from the user equipment to the wireless communication apparatus;

a scheduling unit selects a pair of user equipments that perform the multiplex communication based on a result of the channel estimation;

a precoding selection unit determines a precoding matrix of a projection matrix that is applied to a channel response matrix of one user equipment in order to make channel response matrices of the respective user equipments orthogonal or almost orthogonal to each other in the selected pair of user equipments;

a control information notification unit feeds back control information that includes precoding information that indicates the determined precoding matrix to the corresponding user equipments;

a reception unit receives data transmitted from the respective user equipments of the selected pair of user equipments through a plurality of reception antennas;

a signal separation unit separates the received data to detect a plurality of streams; and a decoding unit decodes reception data from the plurality of detected streams, wherein the scheduling unit selects a first user equipment that is a strong layer having a strong received signal intensity and a second user equipment that is a weak layer having a weak received signal intensity as the pair of user equipments, the precoding selection unit determines the precoding matrix of the projection matrix that is applied to the first user equipment, and the control information notification unit notifies only the first user equipment of the precoding information that indicates the precoding matrix of the projection matrix.

5. The wireless communication apparatus according to claim 1, wherein the control information notification unit notifies, among the pair of user equipments, only the one user equipment that applies the precoding matrix of the precoding information that indicates the precoding matrix of the projection matrix.

6. The wireless communication apparatus according to claim 1, wherein the precoding selection unit determines a first precoding matrix of the projection matrix that is applied only to the one user equipment and a second precoding matrix for forming transmission beams that is applied to the respective user equipments, and the control information notification unit notifies only the one user equipment of the precoding information that indicates the first precoding matrix and notifies the respective user equipments of the precoding information that indicates the second precoding matrix.

7. The wireless communication apparatus according to claim 1, further comprising a power weight determination unit performs transmission power distribution to the selected pair of user equipments and to determine power weights allocated to the respective user equipments, wherein the precoding selection unit determines the precoding matrix of the projection matrix that is applied to the one user equipment having the different power weight, and the control information notification unit notifies the one user equipment of the precoding information that indicates the precoding matrix of the projection matrix.

8. A wireless communication apparatus of a user equipment used in a wireless communication system that can perform multiplex communication between a plurality of user equipments and a base station, the wireless communication apparatus comprising:
    a space multiplexing unit generates a plurality of streams for performing space multiplexing among a plurality of transmission antennas as data that is to be transmitted to the base station;
    a precoding unit which, in a case where precoding information is notified, indicates a precoding matrix of a projection matrix that makes channel response matrices of respective user equipments orthogonal or almost orthogonal to each other in a pair of user equipments that perform the multiplex communication based on control information that is fed back from the base station, performs precoding by applying the precoding matrix to a channel response matrix of a one user equipment of the pair of user equipments with respect to the plurality of streams, wherein the applied precoding matrix maintains the orthogonality of the channel response matrices of the pair of user equipments; and
    a transmission unit transmits the plurality of streams to which the precoding process has been subjected through the plurality of transmission antennas.

9. The wireless communication apparatus according to claim 8, wherein the precoding unit performs first precoding to which a first precoding matrix of the projection matrix is applied and second precoding to which a second precoding matrix for forming transmission beams is applied.

10. The wireless communication apparatus according to claim 8, further comprising a power allocation unit performs allocation of transmission power to the plurality of streams using power weights notified from the base station.

11. A wireless communication method in a wireless communication system that can perform multiplex communication between a plurality of user equipments and the base station, the wireless communication method comprising the steps of:
    performing channel estimation of a propagation path from the user equipment to the own apparatus;
    selecting a pair of user equipments that perform the multiplex communication based on a result of the channel estimation;
    determining a precoding matrix of a projection matrix to make channel response matrices of respective user equipments orthogonal or almost orthogonal to each other in the selected pair of user equipments, wherein the precoding matrix applied to a channel response matrix of a one user equipment of the selected pair of user equipments maintains the orthogonality of the channel response matrices of the selected pair of user equipments;
    feeding control information that includes precoding information that indicates the determined precoding matrix back to the corresponding user equipments;
    receiving data transmitted from the respective user equipments of the selected pair of user equipments through a plurality of reception antennas; separating the received data to detect a plurality of streams; and
    decoding reception data from the plurality of detected streams.

12. A wireless communication method in a wireless communication system that can perform multiplex communication between a plurality of user equipments and a base station, the wireless communication method comprising the steps of:
    generating a plurality of streams for performing space multiplexing among a plurality of transmission antennas as data that is to be transmitted to the base station;
    performing precoding, in a case where precoding information is notified, which indicates a precoding matrix of a projection matrix that makes channel response matrices of respective user equipments orthogonal or almost orthogonal to each other in a pair of user equipments that perform the multiplex communication based on control information that is fed back from the base station, by applying the precoding matrix to a channel response matrix of a one user equipment of the pair of user equipments of the plurality of streams, wherein the applied precoding matrix maintains the orthogonality of the channel response matrices of the pair of user equipments; and
    transmitting the plurality of streams to which the precoding process has been subjected through the plurality of transmission antennas.

\* \* \* \* \*